United States Patent
Narayanan et al.

(10) Patent No.: US 9,342,623 B2
(45) Date of Patent: May 17, 2016

(54) AUTOMATICALLY GENERATING NODES AND EDGES IN AN INTEGRATED SOCIAL GRAPH

(71) Applicant: Facebook, Inc., Menlo Park, CA (US)

(72) Inventors: Srinivasa Narayanan, San Francisco, CA (US); Venkataramanan Nandagopal, Mountain View, CA (US); Eric Sun, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 393 days.

(21) Appl. No.: 14/049,117

(22) Filed: Oct. 8, 2013

(65) Prior Publication Data

US 2014/0040300 A1    Feb. 6, 2014

Related U.S. Application Data

(63) Continuation of application No. 13/465,878, filed on May 7, 2012, now Pat. No. 9,002,898, which is a continuation of application No. 12/763,145, filed on Apr. 19, 2010, now Pat. No. 8,185,558.

(51) Int. Cl.
    G06F 7/00     (2006.01)
    G06F 17/30    (2006.01)
    H04W 4/20     (2009.01)

(52) U.S. Cl.
    CPC .... *G06F 17/30958* (2013.01); *G06F 17/30386* (2013.01); *G06F 17/30964* (2013.01); *G06F 17/30979* (2013.01); *H04W 4/206* (2013.01)

(58) Field of Classification Search
    CPC ................................................ G06F 17/30979
    USPC ....................................................... 707/798
    See application file for complete search history.

(56) References Cited

U.S. PATENT DOCUMENTS 6,539,232 B2    3/2003   Hendrey
6,957,184 B2    10/2005  Schmid
(Continued)

FOREIGN PATENT DOCUMENTS

JP    2010-277322       12/2010
JP    2012-064151 A     3/2012
(Continued)

OTHER PUBLICATIONS

Notice of Preliminary Rejection for Korean Application No. 10-2015-7003977 (with English translation), Apr. 22, 2015.
(Continued)

*Primary Examiner* — Ajith Jacob
(74) *Attorney, Agent, or Firm* — Baker Botts L.L.P.

(57) ABSTRACT

In one embodiment, a method includes maintaining access to a data store of information corresponding to nodes and edges; receiving a user-generated character string comprising one or more characters of text entered by a user in an input form as they are entered by the user; searching the stored information for matches between the user-generated character string and existing nodes; determining whether or not a match between the user-generated character string and an existing node exists; and when it is determined that at least one match exists, generating an edge between the node corresponding to the user and the node for which the best match is determined; and when it is determined that no match between the user-generated character string and an existing node exists, generating a new node based on the user-generated character string, and generating an edge between the node corresponding to the user and the new node.

20 Claims, 13 Drawing Sheets

(56) References Cited

U.S. PATENT DOCUMENTS

| | | |
|---|---|---|
| 7,539,697 B1 | 5/2009 | Akella |
| 7,752,326 B2 | 7/2010 | Smit |
| 7,836,044 B2 | 11/2010 | Kamvar |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Smit |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,732,208 B2 | 5/2014 | Lee |
| 8,751,521 B2 | 6/2014 | Lee |
| 8,782,080 B2 | 7/2014 | Lee |
| 8,868,590 B1 | 10/2014 | Donneau-Golencer |
| 8,868,603 B2 | 10/2014 | Lee |
| 9,002,898 B2 | 4/2015 | Narayanan |
| 2002/0059199 A1 | 5/2002 | Harvey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0243568 A1 | 12/2004 | Wang |
| 2004/0255237 A1 | 12/2004 | Tong |
| 2005/0131872 A1 | 6/2005 | Calbucci |
| 2005/0171955 A1 | 8/2005 | Hull |
| 2006/0041597 A1 | 2/2006 | Conrad |
| 2006/0117378 A1 | 6/2006 | Tam |
| 2006/0136419 A1 | 6/2006 | Brydon |
| 2007/0174304 A1 | 7/2007 | Shrufi |
| 2007/0277100 A1 | 11/2007 | Sheha |
| 2008/0005064 A1 | 1/2008 | Sarukkai |
| 2008/0114730 A1 | 5/2008 | Larimore |
| 2008/0183694 A1 | 7/2008 | Cane |
| 2008/0270615 A1 | 10/2008 | Centola |
| 2009/0006543 A1 | 1/2009 | Smit |
| 2009/0054043 A1 | 2/2009 | Hamilton |
| 2009/0106822 A1 | 4/2009 | Obasanjo |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0259624 A1 | 10/2009 | Demaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0281988 A1 | 11/2009 | Yoo |
| 2009/0287682 A1 | 11/2009 | Fujioka |
| 2009/0299963 A1 | 12/2009 | Pippori |
| 2010/0082695 A1 | 4/2010 | Hardt |
| 2010/0145771 A1 | 6/2010 | Fligler |
| 2010/0235354 A1 | 9/2010 | Gargaro |
| 2011/0078166 A1 | 3/2011 | Oliver |
| 2011/0087534 A1 | 4/2011 | Strebinger |
| 2011/0087968 A1 | 4/2011 | Lakshmanan |
| 2011/0184981 A1 | 7/2011 | Lu |
| 2011/0196855 A1 | 8/2011 | Wable |
| 2011/0231296 A1 | 9/2011 | Gross |
| 2011/0289063 A1 | 11/2011 | Radlinski |
| 2012/0047147 A1 | 2/2012 | Redstone |
| 2012/0059708 A1 | 3/2012 | Galas |
| 2012/0136852 A1 | 5/2012 | Geller |
| 2012/0143921 A1 | 6/2012 | Wilson |
| 2012/0166432 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | van den Oord |
| 2012/0290562 A1 | 11/2012 | Wable |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2013/0007124 A1 | 1/2013 | Sweeney |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0166601 A1 | 6/2013 | Chrapko |
| 2013/0191372 A1 | 7/2013 | Lee |
| 2013/0191416 A1 | 7/2013 | Lee |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254305 A1 | 9/2013 | Cheng |
| 2014/0006416 A1 | 1/2014 | Leslie |
| 2014/0024702 A1 | 1/2014 | Curtiss |
| 2014/0040300 A1 | 2/2014 | Narayanan |
| 2014/0067535 A1 | 3/2014 | Rezaei |
| 2014/0222807 A1 | 8/2014 | Lee |
| 2014/0222835 A1 | 8/2014 | Lee |
| 2014/0222854 A1 | 8/2014 | Lee |
| 2015/0006566 A1 | 1/2015 | Lee |
| 2015/0081686 A1 | 3/2015 | Lee |
| 2015/0161290 A1 | 6/2015 | Narayanan |

FOREIGN PATENT DOCUMENTS

| | | |
|---|---|---|
| JP | 2012-133735 A | 7/2012 |
| KR | 10-0459832 | 6/2005 |
| KR | 2007-0049426 | 5/2007 |
| KR | 2009-0072575 | 7/2009 |
| WO | 2012/058690 A2 | 5/2012 |
| WO | WO 2012/094531 A1 | 7/2012 |

OTHER PUBLICATIONS

Hebrew Office Action for Application No. 236754, Mar. 16, 2015.
Notice of Preliminary Rejection for Korean Application No. 10-2015-7004265 (with English translation), Apr. 30, 2015.
Sebastian Marius Kirsch, et al., "Beyond the Web: Retrieval in Social Information Spaces," Advances in Information Retrieval Lecture Notes in Computer Science; Springer, Berlin, DE, pp. 84-95, Jan. 1, 2006.
Renaud Delbru, et al., "Searching web data: An entity retrieval and high-performance indexing model," Web Semantics: Science, Services and Agents on the World Wide Web, vol. 10, pp. 33-58, May 13, 2011.
U.S. Appl. No. 14/489,914, filed Sep. 18, 2014, Lee.
U.S. Appl. No. 14/251,026, filed Apr. 11, 2014, Lee.
U.S. Appl. No. 14/251,069, filed Apr. 11, 2014, Lee.
U.S. Appl. No. 14/251,114, filed Apr. 11, 2014, Lee.
U.S. Appl. No. 14/538,692, filed Nov. 10, 2014, Lee.

(56) References Cited

OTHER PUBLICATIONS

Japanese Office Action for Application 2015-524319 (with translation), Aug. 4, 2015.
Japanese Office Action for Application 2015-524322 (with translation), Aug. 4, 2015.
U.S. Appl. No. 14/925,894, filed Oct. 28, 2015, Narayanan.
U.S. Appl. No. 14/627,082, filed Feb. 20, 2015, Narayanan.
Israeli Patent Authority Office Action for Israeli Patent Application No. 236810 (with translation), Apr. 29, 2015.
Zhdanova, AV, et al., "A Social Networking Model of a Web Community", In: Proceedings of 10th international symposium on social communication, pp. 1-5, 2007.
Xin Xin, I.K., et al., "A Social Recommendation Framework Based on Multi-scale Continuous Conditional Random Fields," CIKM'09; pp. 1247-1256, Nov. 2-6, 2009.
IEEE Xplore Search Results for: "social network document node recommend" Listed by examiner in U.S. Appl. No. 12/763,145, Dec. 8, 2012.
U.S. Appl. No. 13/556,017, filed Jul. 23, 2012, Curtiss.
ACM Digital Library: Search Results for: "social network document node recommend" Listed by examiner in U.S. Appl. No. 12/763,145, Dec. 8, 2012.
Sankar, et al., "Under the Hood: Building out the infrastructure for Graph Search's infrastructure"; Available online at FTP: https://www.facebook.com/note.php?note_id=10151347573598920; pp. 1-8. [downloaded Nov. 5, 2013], Mar. 6, 2013.
Li, et al., "Under the Hood: The natural language interface of Graph Search," Available online at FTP: https://www.facebook.com/notes/facebook-engineering/under-the-hood-the-natural-language-interface-of-graph-search/10151432733048920; pp. 1-8. [downloaded Nov. 5, 2013], Apr. 29, 2013.
Sankar, et al., "Under the Hood: Indexing and ranking in Graph Search," https://www.facebook.com/notes/facebook-engineering/under-the-hood-indexing-and-ranking-in-graph-search/10151361720763290; pp. 1-9, [downloaded Nov. 5, 2013], Mar. 14, 2013.
European Patent Office Communication for Application 13 197 982. 5-1952 Dec. 18, 2015.

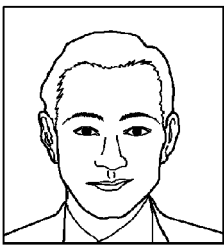

Colin Lee Baker

Wall | Info | Photos | Boxes
401a  401b  401c   401d

403

402 — Basic Information                                Edit Information

Sex:                Male                      440 — edit
 Current City:       Santa Clara, CA
 Birthday:           March 23, 1981
 Hometown:           Medina, OH
 Relationship Status: In a Relationship
 Looking For:        Friendship
                     Networking
 Political Views:    Liberal 406 — Personal Information 408 — Activities:       Weight Lifting, hiking;   440 — edit
                        Playing Pingpong foozball
410 — Interests:        reading, photography
412 — Favorite Music:   rock, Classical
414 — Favorite TV Shows: south park, family guy, Msntx:
416 — Favorite Movies:  Seven Pounds, Anything with Johnny Depp
418 — Favorite Books:   The Da Vinci Code, Touching The Void, Tolkien
420 — Favorite Quotations: Genius is one per cent inspiration,
                        ninety-nine per cent perspiration
422 — About Me:         I try to strike a balance in life 424 — Contact Information Email:              cbaker@gmail.com           440 — edit
 Mobile Number:      408-555-5555
 Current City:       San Jose, CA Education and Work 426 — Grad School:      Stanford '06              440 — edit
                        Master of Science, Electrical Engineering
 College:            The University of Akron '04
                     Physics, Biomedical Engineering
 High School:        Highland High School '99
 Employer:           International Bank
 Position:           Personal Loan Agent
 Time Period:        October 2008 - Present
 Location:           Sacramento, CA
 Description:        Intellectual Property Law

Side panel:

View Photos of Me (57)
Edit My Profile

Write something
about yourself.

Information
Relationship Status:
In a Relationship
Birthday:
March 23, 1981
Current City:
Santa Clara, CA
Hometown:
Medina, OH Friends — 428
188 friends       See All

  
Sally    Ben       Jane
Jacobs   Shuster   Fraser

429

  
Dan     Ann       Jim
Hill    Francis   Armstead

*FIG. 4A*

AUTOMATICALLY GENERATING NODES AND EDGES IN AN INTEGRATED SOCIAL GRAPH

PRIORITY

This application is a continuation under 35 U.S.C. §120 of U.S. patent application Ser. No. 13/465,878, filed 7 May 2012, which is a continuation under 35 U.S.C. §120 of U.S. patent application Ser. No. 12/763,145, filed 19 Apr. 2010, which issued as U.S. Pat. No. 8,185,558 on 22 May 2012, each of which is incorporated by reference.

TECHNICAL FIELD

The present disclosure relates generally to social networking, and more particularly, to an integrated social network environment and social graph mapped based on the social network environment that includes nodes representing users and concepts in the social network environment as well as edges that define or represent connections between such nodes. The present disclosure additionally relates to processes for automatically generating nodes and edges in the social graph. The present disclosure further relates to processes for utilizing information extracted from the social graph to dynamically determine recommendations, such as recommended web pages corresponding to recommended nodes, for display to a user of the social network environment as the user is viewing a structured document.

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs). Conventional approaches to enable sharing of user-generated content include various information sharing technologies or platforms such as social networking websites. Such websites may include, be linked with, or provide a platform for applications enabling users to view "profile" pages created or customized by other users where visibility and interaction with such profiles by other users is governed by some characteristic set of rules. By way of example, a user profile may include such user-declared information as contact information, background information, job/career information, as well as interests.

A traditional social network is a social structure made of individuals, groups, entities, or organizations generally referred to as "nodes," which are tied (connected) by one or more specific types of interdependency. Social network (graph) analysis views social relationships in terms of network theory consisting of nodes and edges. Nodes are the individual actors within the networks, and edges are the relationships between the actors. The resulting graph-based structures are often very complex. There can be many kinds of edges between nodes. In its simplest form, a social network, or social graph, is a map of all of the relevant edges between all the nodes being studied.

BRIEF DESCRIPTION OF THE DRAWINGS

FIGS. 4A-4D each illustrates an example user profile page.

DESCRIPTION OF EXAMPLE EMBODIMENTS

Figure 1:
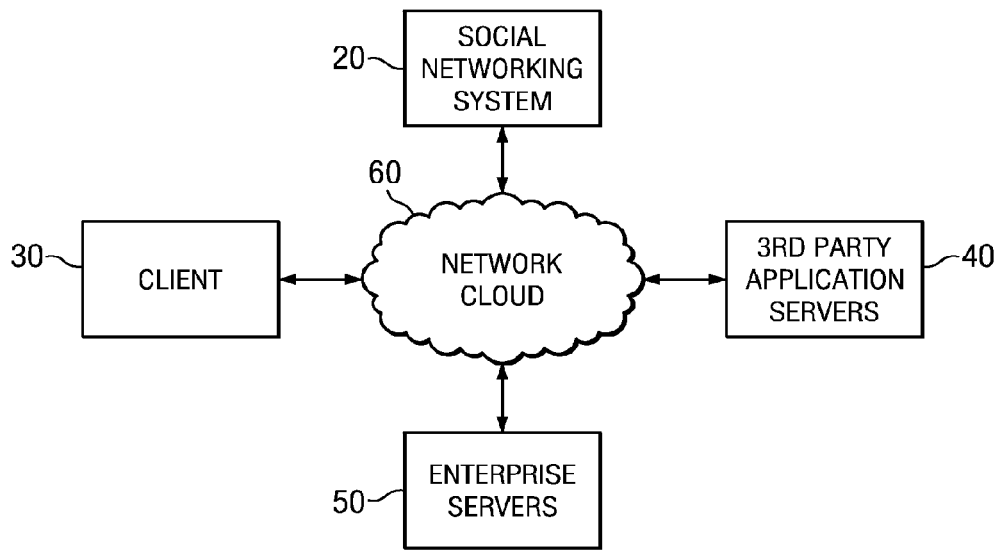
FIG. 1 illustrates an example computer network environment of an example social network environment.

Particular embodiments relate to a social network environment that includes an infrastructure or platform (hereinafter infrastructure and platform may be used interchangeably) enabling an integrated social network environment. In the present disclosure, the social network environment may be described in terms of a social graph including social graph information. In particular embodiments, one or more computing systems of the social network environment implementing the social network environment include, store, or have access to a data structure that includes social graph information for use in implementing the social network environment described herein. In particular embodiments, the social graph information includes a first set of user nodes that each correspond to a respective user, and a second set of concept nodes that each correspond to a respective concept. As used herein, a "user" may be an individual (human user), an entity (e.g., an enterprise, business, or third party application), or a group (e.g., of individuals or entities) that interacts or communicates with or over such a social network environment. As used herein, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a third party application, a celebrity, a person who is not a registered user, etc. In particular embodiments, each node has, represents, or is represented by, a corresponding web page ("profile page") hosted or accessible in the social network environment. By way of example, a user node may have a corresponding user profile page in which the corresponding user can add content, make declarations, and otherwise express him or herself, while a concept node may have a corresponding concept profile page ("hub") in which a plurality of users can add content, make declarations, and express themselves, particularly in relation to the concept. In particular embodiments, the social graph information further includes a plurality of edges that each define or represent a connection between a corresponding pair of nodes in the social graph.

In some embodiments, each edge may be one of a plurality of edge types based at least in part on the types of nodes that the edge connects in the social graph. By way of example, in one particular embodiment, each edge from a first edge type defines a connection between a pair of user nodes from the first set, while each edge from a second edge type defines a connection between a user node from the first set and a concept node from the second set. Furthermore, each edge from a third edge type may define a connection between a pair of concept nodes from the second set. In such embodiments, the edge itself may store, or be stored with, data that defines a type of connection between the pair of nodes the edge connects, such as, for example, data describing the types of the nodes the edge connects (e.g., user or concept), access privileges of an administrator of one of the pair of nodes connected by the edge with respect to the other node the edge connects to (e.g., read or write access of an administrator of one node with respect to the other node connected by the edge), or data describing how or why the edge was first initialized or created (e.g., in response to an explicit user action or declaration, or automatically without an explicit user action), the strength of the connection as determined by various factors or criteria related to or shared by the nodes connected by the edge, among other suitable or relevant data. In an alternate embodiment, each edge may simply define or represent a connection between nodes regardless of the types of nodes the edge connects; that is, the edge itself may store, or be stored with, identifiers of the nodes the edge connects but may not store, or be stored with, data that describes a type of connection between the pair of nodes the edge connects. Furthermore, in any of these or other embodiments, data that may indicate the type of connection or relationship between nodes connected by an edge may be stored with the nodes themselves.

Particular embodiments further relate to a method for automatically generating nodes and edges based on information currently being entered by a user of a social network environment. In particular embodiments, one or more client-side and/or backend (server-side) processes implement and utilize a "typeahead" feature to automatically attempt to match concepts corresponding to respective existing nodes to information currently being entered by a user in an input form rendered in conjunction with a requested web page, such as a user profile page, which may be hosted or accessible in, by the social network environment. In particular embodiments, when a match is found, these or other processes may then automatically generate an edge from a node corresponding to the user (the user's node) to the existing node corresponding to the concept match. Particular embodiments further relate to one or more processes that automatically create a new node and an edge from the new node to the user's node when a match to an existing concept and corresponding node is not found, or at least not found with a desired level of certainty. By way of example, as will be described below, various web pages hosted or accessible in, the social network environment such as, for example, user profile pages, enable users to add content, declare interests, or otherwise express themselves (hereinafter also referred to collectively as "declarations"), including by linking to, or otherwise referencing additional content, such as media content (e.g., photos, videos, music, text, etc.), uniform resource locators (URLs), an other nodes, via their respective profile pages or other concept profile pages. Such declarations may then be viewable by the authoring users as well as other users. In particular embodiments, as a user is entering text to make a declaration, the typeahead feature attempts to match the string of textual characters being entered in the declaration to strings of characters (e.g., names) corresponding to existing concepts (or users) and corresponding concept (or user) nodes in the social graph. In particular embodiments, when a match is found, the typeahead feature may automatically populate the form with a node name (or other identifier) of the existing node and, as just described, cause an edge to be created between the matching existing node and the user's node. In particular embodiments, as a user continues to enter text and the typeahead feature determines that all or a portion of the declaration does not match any existing node, at least according to a statically or dynamically determined level of certainty, the typeahead feature may cause the social network environment to automatically create a new node based on the declaration entered by the user, as well as an edge from the user's node to the new node.

Particular embodiments further relate to a method for automatically generating nodes and edges based on information previously entered by users of a social network environment. In particular embodiments, one or more backend (server-side) processes implement and utilize a "bootstrapping" feature to automatically attempt to match known concepts indexed in a data store, each of which may or may not be associated with or correspond to a respective existing node in the social graph, to information previously entered by a user in one or more of a variety of forms or formats and stored in the social network environment. In particular embodiments, when a match to a known concept is found, these or other processes may then automatically generate an edge from a node corresponding to the user (for which the previously entered information was matched) to an existing node corresponding to the concept match. Particular embodiments further relate to one or more processes that, when a match to a known concept is found but where no node currently exists for the known concept, automatically create a new node for the known concept and an edge from the new node to the user's node. Particular embodiments further relate to one or more processes that, when a match to a known concept or existing node is not found, or at least not found with a desired level of certainty, automatically create a new node based on the previously entered information and an edge from the new node to the user's node.

Particular embodiments further relate to a method for populating a "concept database" using data obtained from one or more internal or external sources. In particular embodiments, the concept database includes an index of known concepts as well as, in some embodiments, various attributes, metadata, or other information associated with the respective concepts. In particular embodiments, one or more backend (server-side) processes crawl one or more external data sources (e.g., WIKIPEDIA (www.wikipedia.org), FREEBASE (www.freebase.com, available from METAWEB), or the internet in general) to facilitate or aid in generating or populating the concept database. In some embodiments, the concept database may also be augmented with information extracted from users of the social network environment described herein.

Particular embodiments further relate to a method for generating one or more recommendations for display to a user of a social network environment currently viewing a particular web page or structured document hosted at least in part by the social network environment. In particular embodiments, one or more server-side recommendation-generating processes generate the recommendations for display to the user in (on) the currently viewed page based at least in part on information extracted from a social graph. More particularly, the one or more server-side recommendation-generating processes may leverage the social graph information including information related to the user, the currently viewed page, friends of the user who are also connected in some fashion to the currently viewed page, and other web pages or structured documents connected in some fashion to the currently viewed page, to determine one or more other web pages or structured documents that the user may desire to connect to and then subsequently generate a list or set of these recommended pages for display in some fashion to the user in the currently viewed page.

Various portions of such a social networking platform may be implemented via a hardware architecture or software framework that enables various software components or processes to implement particular embodiments, as is described in more detail, by way of example and not by way of limitation, below. The platform may include one or more hardware or software components, one or more of which may be located or embodied in one or more consolidated or distributed computing systems. Additionally, as used herein, "or" may imply "and" as well as "or;" that is, "or" does not necessarily preclude "and," unless explicitly stated or implicitly implied.

As just described, in various example embodiments, one or more described web pages or web applications are associated with a social network environment or social networking service. As used herein, a "user" may be an individual (human user), an entity (e.g., an enterprise, business, or third party application), or a group (e.g., of individuals or entities) that interacts or communicates with or over such a social network environment. As used herein, a "registered user" refers to a user that has officially registered within the social network environment (Generally, the users and user nodes described herein refer to registered users only, although this is not necessarily a requirement in other embodiments; that is, in other embodiments, the users and user nodes described herein may refer to users that have not registered with the social network environment described herein). In particular embodiments, a registered user has a corresponding "profile" page stored or hosted by the social network environment and viewable by all or a selected subset of other users. Generally, a user has administrative rights to all or a portion of his or her own respective profile page as well as, potentially, to other pages created by or for the particular user including, for example, home pages, pages hosting web applications, among other possibilities. As used herein, an "authenticated user" refers to a user who has been authenticated by the social network environment as being the user claimed in a corresponding profile page to which the user has administrative rights or, alternately, a suitable trusted representative of the claimed user.

As used herein, a "connection" may represent a defined relationship between users or concepts of the social network environment, which can be defined logically in a suitable data structure of the social network environment and can be used to define a relationship (hereinafter referred to as an edge) between the nodes corresponding to the users or concepts of the social network environment for which the connection has been made. As used herein, a "friendship" represents a connection, such as a defined social relationship, between a pair of users of the social network environment. A "friend," as used herein, may refer to any user of the social network environment with which another user has formed a connection, friendship, association, or relationship with, causing an edge to be generated between the two users. By way of example, two registered users may become friends with one another explicitly such as, for example, by one of the two users selecting the other for friendship as a result of transmitting, or causing to be transmitted, a friendship request to the other user, who may then accept or deny the request. Alternately, friendships or other connections may be automatically established. Such a social friendship may be visible to other users, especially those who themselves are friends with one or both of the registered users. A friend of a registered user may also have increased access privileges to content, especially user-generated or declared content, on the registered user's profile or other page. It should be noted, however, that two users who have a friend connection established between them in the social graph may not necessarily be friends (in the conventional sense) in real life (outside the social networking environment). For example, in some implementations, a user may be a business or other non-human entity, and thus, incapable of being a friend with a human being user in the traditional sense of the word.

As used herein, a "fan" may refer to a user that is a supporter of a particular web page, web application, or other web content accessible in the social network environment. In particular embodiments, when a user is a fan of a particular web page ("fans" the particular web page), the user may be listed on that page as a fan for other registered users or the public in general to see. Additionally, an avatar or profile picture of the user may be shown on the page (or in/on any of the pages described below). As used herein, a "like" may refer to something, such as, by way of example and not by way of limitation, an interest, a link, a piece of media (e.g., photo, photo album, video, song, etc.) a concept, an entity, or a page, that a user, and particularly a registered or authenticated user, has declared or otherwise demonstrated that he or she likes, is a fan of (as used herein in various example embodiments, to "like" or to "fan" something, such as a concept or concept profile page, may be defined equivalently in the social networking environment and may be used interchangeably; similarly, to declare oneself a "fan" of something, such as a concept or concept profile page, or to declare that oneself "likes" the thing, may be defined equivalently in the social networking environment and used interchangeably herein), supports, enjoys, or otherwise has a positive view of. As used herein, an "interest" may refer to a user-declared interest, such as a user-declared interest presented in the user's profile page. As used herein, a "want" may refer to virtually anything that a user wants. As described above, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a celebrity, a person who is not a registered user, or even, in some embodiments, another user (e.g., a non-authenticated user), etc. By way of example, there may be a concept node and concept profile page for "Jerry Rice," the famed professional football player, created and administered by one or more of a plurality of users (e.g., other than Jerry Rice), while the social graph additionally includes a user node and user profile page for Jerry Rice created by and administered by Jerry Rice, himself. In particular embodiments, as will be described in more detail below, a friend connection or friendship may define or indicate a logical connection defined or represented by an edge between user nodes in the social graph, while a like, want, fan, or other connection demonstrating, generally, an interest or association may define a logical connection or edge between a user node and a concept node in the social graph (and in some embodiments, between two user nodes, or between two concept nodes).

Particular embodiments may operate in, or in conjunction with, a wide area network environment, such as the Internet, including multiple network addressable systems. FIG. 1 illustrates an example network environment, in which various example embodiments may operate. Network cloud 60 generally represents one or more interconnected networks, over which various systems and hosts described herein may communicate. Network cloud 60 may include packet-based wide area networks (such as the Internet), private networks, wireless networks, satellite networks, cellular networks, paging networks, and the like. As FIG. 1 illustrates, particular embodiments may operate in conjunction with a network environment comprising social network environment 20 and client devices 30, as well as, in some embodiments, one or more third party web application servers 40 or one or more enterprise servers 50. Client devices 30, web application servers 40, and enterprise servers 50 may be operably connected to the network environment and network cloud 60 via a network service provider, a wireless carrier, a set of routers or networking switches, or any other suitable means.

Figure 2A:
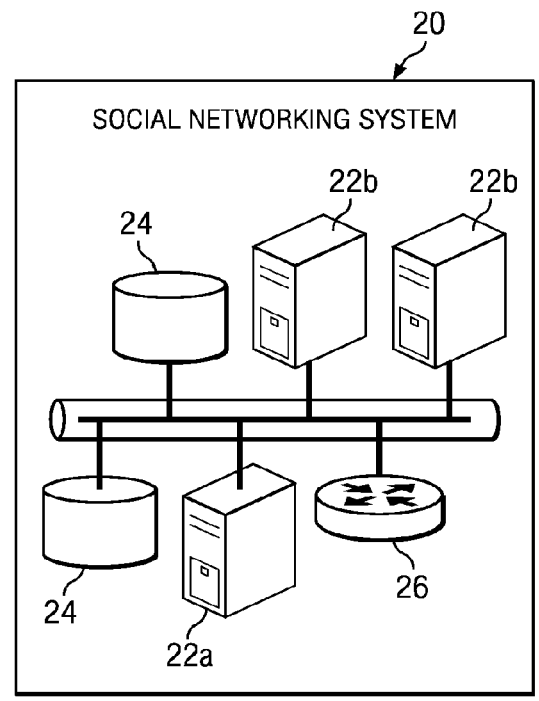
FIG. 2A illustrates example components of an example social network environment.
Figure 2B:
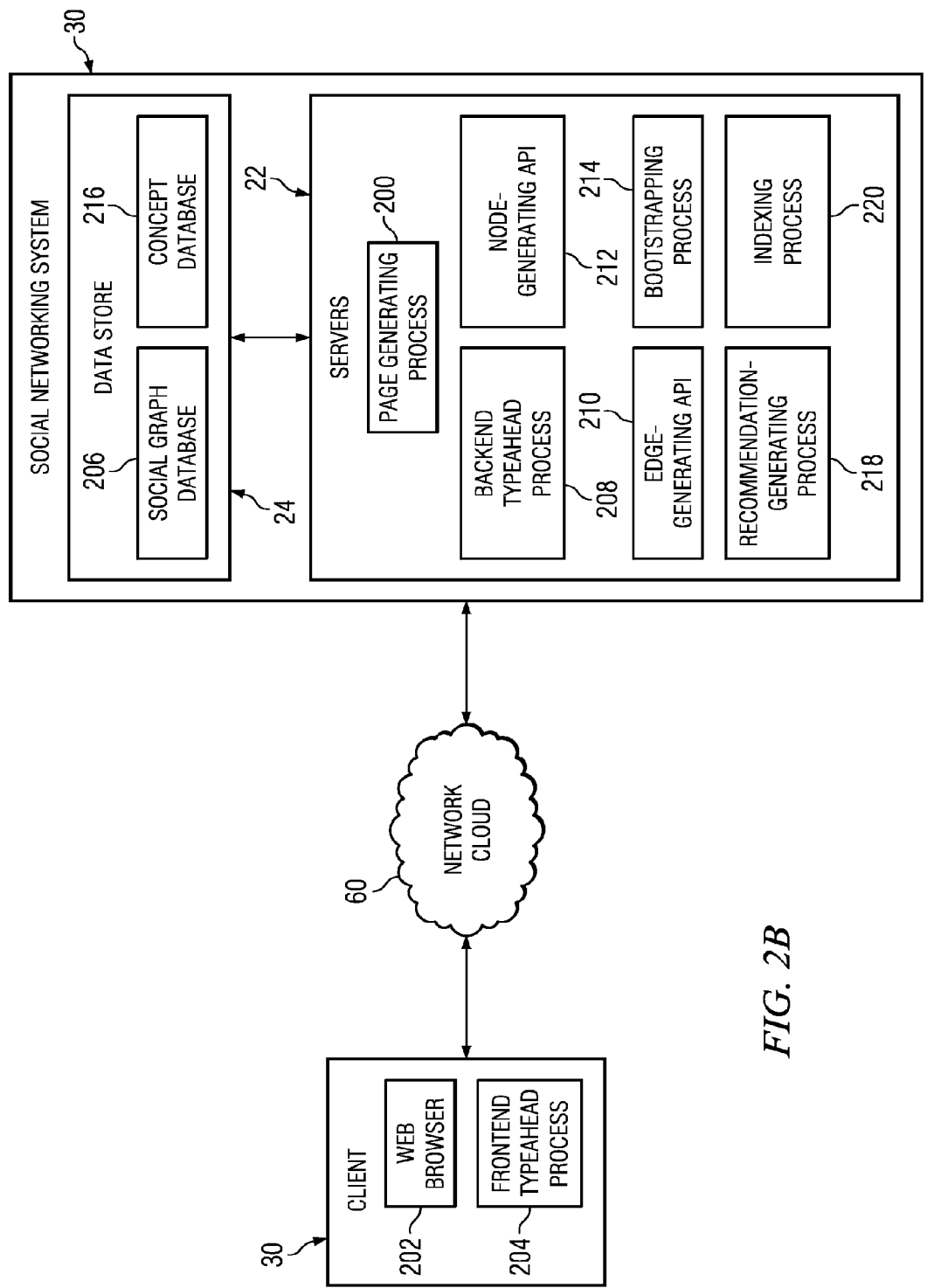
FIG. 2B illustrates an example architecture of the example social network environment of FIG. 2A and an example architecture of an example client device of FIG. 1.

Each client device 30, web application server 40, or enterprise server 50 may generally be a computer, computing system, or computing device (such as that described below with reference to FIG. 9) including functionality for communicating (e.g., remotely) over a computer network. Client device 30 in particular may be a desktop computer, laptop computer, personal digital assistant (PDA), in- or out-of-car navigation system, smart phone or other cellular or mobile device, or mobile gaming device, among other suitable computing devices. Client device 30 may execute one or more client applications, such as a web browser 202 (e.g., MICROSOFT WINDOWS INTERNET EXPLORER, MOZILLA FIREFOX, APPLE SAFARI, GOOGLE CHROME, AND OPERA, etc.), as illustrated in FIG. 2B, to access and view content over a computer network 60. In particular implementations, the client applications allow a user of client device 30 to enter addresses of specific network resources to be retrieved, such as resources hosted by social network environment 20, web application servers 40, or enterprise servers 50. These addresses can be Uniform Resource Locators (URLs). In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

More particularly, when a user at a client device 30 desires to view a particular web page (hereinafter also referred to as a target structured document) hosted by social network environment 20, or a web application hosted by a web application server 40 and made available in conjunction with social network environment 20, the user's web browser 202, or other client-side structured document rendering engine or suitable client application, formulates and transmits a request to social network environment 20. The request generally includes a URL or other document identifier as well as metadata or other information. By way of example, the request may include information identifying the user, such as a user ID, as well as information identifying or characterizing the web browser 202 or operating system running on the user's client computing device 30. The request may also include location information identifying a geographic location of the user's client device or a logical network location of the user's client device, as well as timestamp identifying when the request was transmitted.

In an example implementation, when a request for a web page or structured document hosted by social network environment 20 is received by the social network environment 20, one or more page-generating processes 200 executing within the social network environment 20 typically generate a base web page in the form of a Hyper Text Markup Language (HTML), Extensible Markup Language (XML), or other web browser-supported structured document. The generated structured document is then transmitted in a response, which may comprise one or more portions or partial responses, to the requesting client 30 via a Hypertext Transfer Protocol (HTTP) or other suitable connection for rendering by the web browser 202 at the client device 30. The structured document may include one or more resources (e.g. JavaScript scripts, code segments, or resources, Cascading Style Sheet (CSS) code segments or resources, image data or resources, video data or resources, etc.), or references to such resources, embedded within the transmitted document. By way of example, a resource embedded in an HTML document may generally be included or specified within a script element, image element, or object element, among others, depending on the type of resource. The element referencing or specifying the resource may include a source attribute (e.g., src) identifying a location of the resource, which may be within a server or data store within social network environment 20 or at one or more external locations, to the client device 30 requesting the web page. Typically, upon receipt of the response, the web browser 202 or other client document rendering application running at the client device 30 then constructs a document object model (DOM) representation of the received structured document and requests the resource(s) (which may be at one or more other external locations) embedded in the document.

In an example implementation, when a registered user of social network environment 20 first requests a web page from social network environment 20 in a given user session, the response transmitted to the user's client device 30 from social network environment 20 may include a structured document generated by page-generating process 200 for rendering a login page at the client device. The user may then enter his or her user login credentials (e.g., user ID and password), which are then transmitted from the user's client device 30 to social network environment 20. Upon successful authentication of the user, social network environment 20 may then transmit a response to the user's web browser 202 at the user's client device 30 that includes a structured document generated by page-generating process 200 for rendering a user homepage or user profile page at the user's client device. Furthermore, in particular embodiments, and as will be described below, this or a subsequent response may further include one or more executable code segments (e.g., JavaScript) that, when received by the user's client device 30, implement a frontend (client-side) typeahead process 204 that executes in conjunction with the user's web browser 202.

In one example embodiment, social network environment 20 comprises computing systems that allow users at client devices 30 to communicate or otherwise interact with each other and access content, such as user profiles, as described herein. Social network environment 20 is a network addressable system that, in various example embodiments, comprises one or more physical servers 22a or 22b (hereinafter also referred to collectively as servers 22) as well as one or more data stores collectively referred to herein as data store 24 (which may be implemented in or by one or more of a variety of consolidated or distributed computing systems, databases, or data servers), as illustrated in FIG. 2A. The one or more physical servers 22 are operably connected to computer network 60 via, by way of example, a set of routers or networking switches 26. In an example embodiment, the functionality hosted by the one or more physical servers 22 may include web or HTTP servers, FTP servers, as well as, without limitation, web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), and the like.

Physical servers 22 may host functionality directed to the operations of social network environment 20. By way of example, social network environment 20 may host a website that allows one or more users, at one or more client devices 30, to view and post information, as well as communicate with one another via the website. Hereinafter, servers 22 may be referred to as server 22, although, as just described, server 22 may include numerous servers hosting, for example, social network environment 20, as well as other content distribution servers, data stores, or databases. Data store 24 may store content and data relating to, and enabling, operation of the social network environment as digital data objects including content objects. A data object, in a particular implementation, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 24 corresponds to one or more of a variety of separate or integrated databases, such as relational databases and object-oriented databases, that maintain information as an integrated collection of logically related records or files stored on one or more physical systems. Structurally, data store 24 may generally include one or more of a large class of data storage and management systems. In particular embodiments, data store 24 may be implemented by any suitable physical system(s) including components, such as one or more database servers, mass storage media, media library systems, storage area networks, data storage clouds, and the like. In one example embodiment, data store 24 includes one or more servers, databases (e.g., MySQL), and/or data warehouses.

Data store 24 may include data associated with different social network environment 20 users, client devices 30, web application servers 40, or enterprise servers 50, as well as, in particular embodiments, data associated with various concepts. As described above, particular embodiments relate to a social network environment 20 that includes a platform enabling an integrated social network environment. In the following example embodiments, the social network environment may be described or implemented in terms of a social graph including social graph information. In particular embodiments, data store 24 includes a social graph database 206 in which the social graph information for use in implementing the social network environment described herein is stored. In particular embodiments, the social graph information stored by social network environment 20 in data store 24, and particularly in social graph database 206, includes a plurality of nodes and a plurality of edges that define connections between corresponding nodes. In particular embodiments, the nodes or edges themselves are data objects that include the identifiers, attributes, and information (including the information for their corresponding profile pages) for their corresponding users or concepts (as described below), some of which is actually rendered on corresponding profile or other pages. The nodes may also include pointers or references to other objects, data structures, or resources for use in rendering content in conjunction with the rendering of the profile pages corresponding to the respective nodes.

Figure 3:
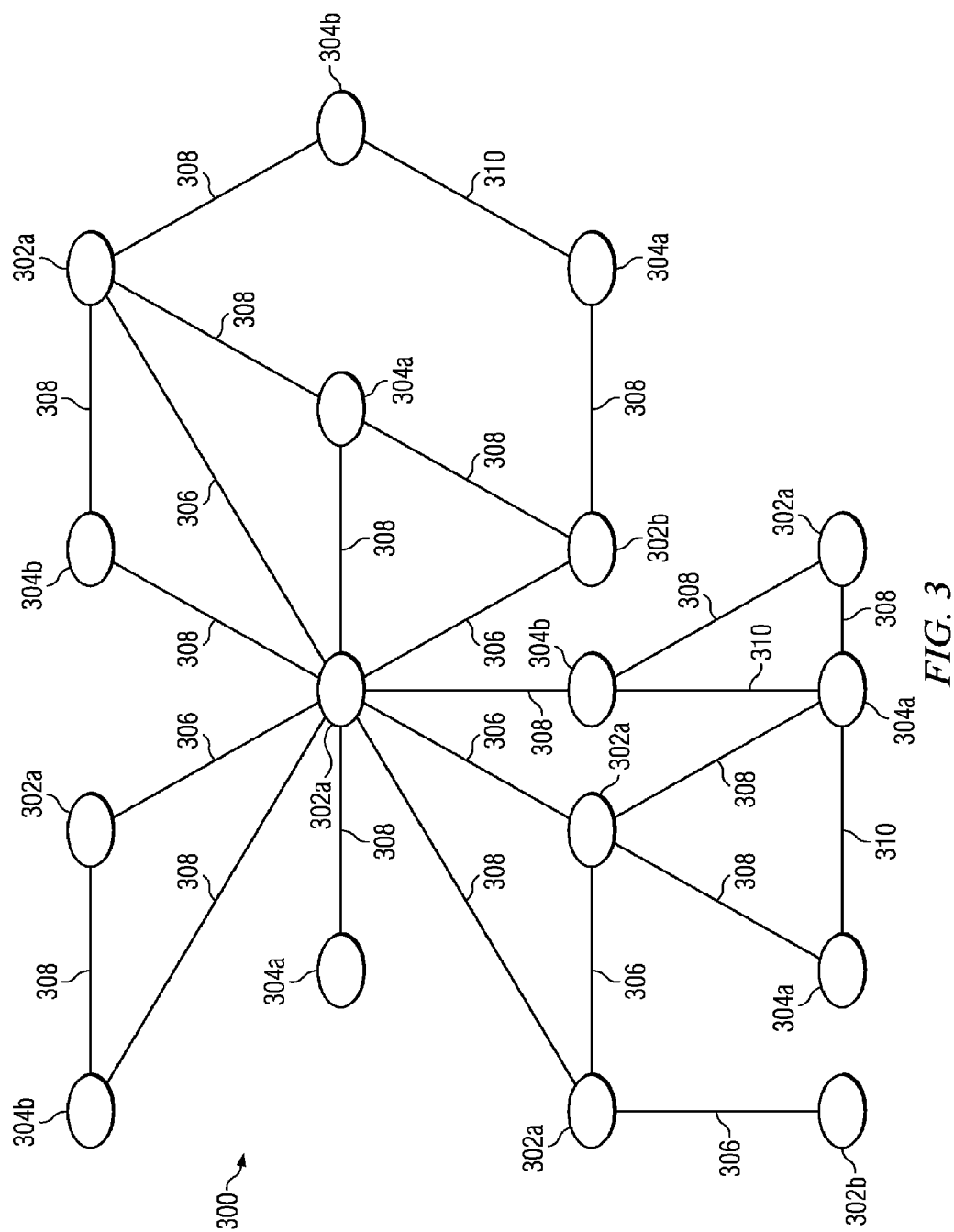
FIG. 3 illustrates an example social graph.

FIG. 3 illustrates an example social graph 300 shown, for didactic purposes, in a two-dimensional visual map representation. In particular embodiments, the plurality of nodes and edges of social graph 300 are stored as data objects in data store 24, and particularly social graph database 206, as described above. Additionally, as will be described later, data store 24 may further include one or more searchable or queryable indexes of nodes or edges generated by indexing social graph database 206. In particular embodiments, the plurality of nodes includes a first set of administered nodes 302 and a second set of un-administered nodes 304. In particular embodiments, the first set of administered nodes 302 are user-administered nodes (hereinafter also referred to as "user nodes") that each correspond to a respective user and a respective user profile page of that user. In particular embodiments, user profile pages corresponding to user nodes 304 may be modified, written to, or otherwise administered by, and only by, their respective owner (registered) users (unless an official administrator of social network environment 20 in general desires or requires access to modify or delete a user's profile page, e.g., as a result of scrupulous or otherwise inappropriate action on the part of the registered user). In one particular embodiment, the first set of user nodes 302 includes a first subset of authenticated nodes 302a and a second subset of un-authenticated nodes 302b. In a particular embodiment, the first subset of authenticated nodes 302a correspond to respective registered authenticated users while the second subset of un-authenticated nodes 302b correspond to registered users who have not been authenticated by social network environment. For example, an authenticated user may be a user who has been verified to be who they claim to be in his or her respective profile page while an un-authenticated user may be a user who has not been verified to be who they claim to be in his or her respective profile page (e.g., an un-authenticated user may register a profile page in President Barack Obama's name, although the un-authenticated user is not President Obama). In some embodiments, for some existing user profile pages, social network environment 20 may determine whether the administrator of the user profile page is truly the authentic voice of the claimed user (real person the user claims to be). If it is determined that the current administrator is not the authentic or true claimed user, social network environment 20 may remove the user's administrative rights to the page. In this way, the user node and corresponding user profile page may be redefined in the social graph information stored in social graph database 206 as a concept node 304 and corresponding concept profile page as will be described later. It should further be noted that, in various example embodiments, user nodes 302a and 302b may or may not be classified distinctly as different node types; that is, in one embodiment, a user node 302 may be identified as an authenticated user node or an un-authenticated user node based on the data stored with or within the data object corresponding to the node rather than by an explicit user node type or sub-type.

Figure 4B:
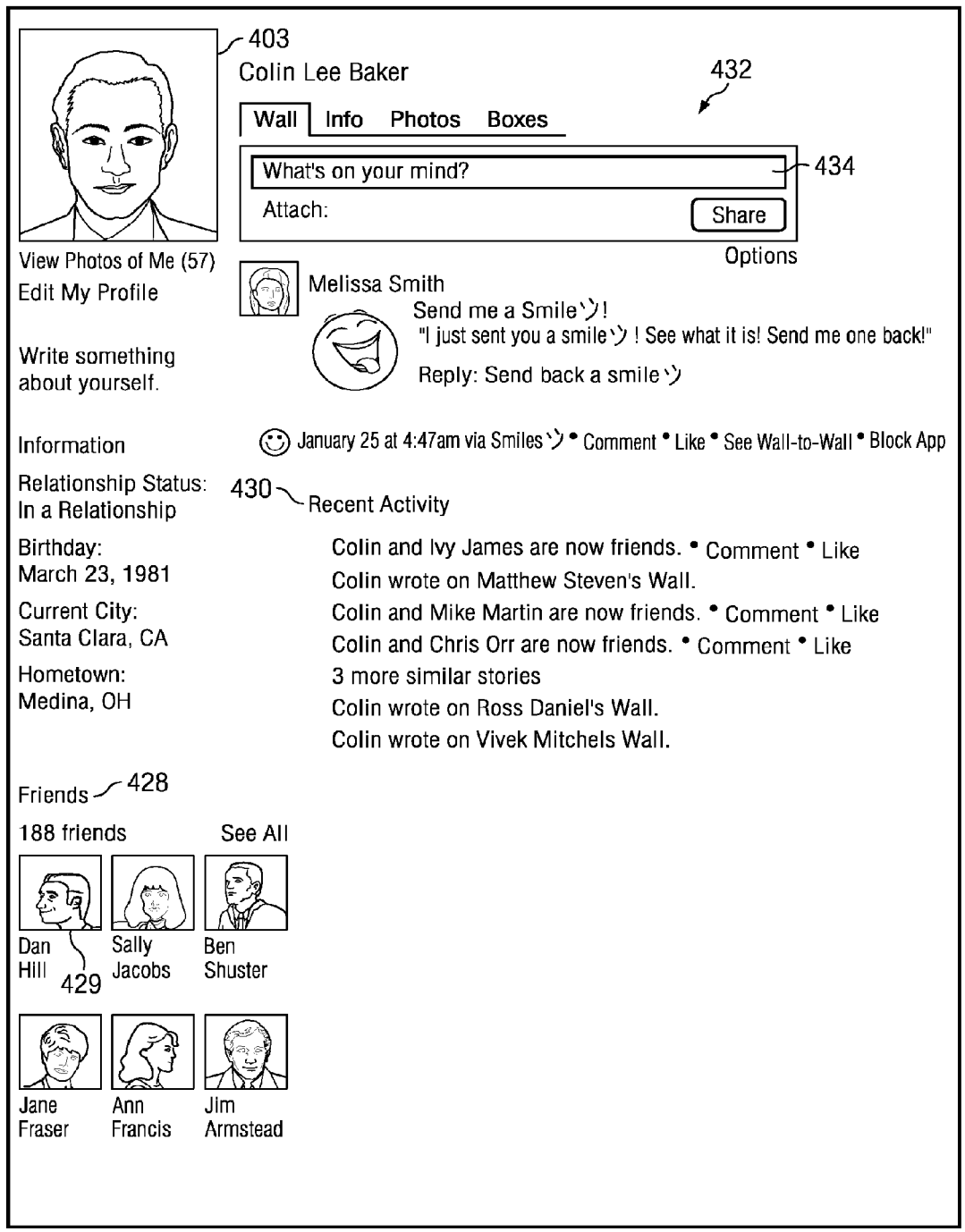

FIG. 4A illustrates an example user profile page of a user corresponding to a user node 302. In particular embodiments, a user profile page is visible to the user, the user's friends, and even other non-friend users depending on privacy settings, which may be set or modified by the user via the user's profile page or a user homepage, for example. The user profile page may comprise a number of different subpages viewable or accessible via selecting one or more tabs 401. By way of example, in the embodiment illustrated in FIG. 4A, the user profile page includes a Wall (feed) tab 401a for accessing a wall (feed) for postings (described below), an Info tab 401b for entering and displaying information about or related to the user, a Photos tab 401c for uploading and displaying photos, and a Boxes tab 401d. A user may select a particular photo or picture uploaded in photos tab 401c for display as a user profile picture 403. In an example implementation, the user's profile picture 403 as well as other features such as, for example, the options to send a message to another user, edit the profile page, view friends of the user, or view photos of the user, may be displayed in a "chrome" (border) region of the page no matter which of tabs 401 is selected. In some implementations, a search bar or search interface is also rendered in the chrome of a user profile page (as well as other pages) enabling users to type in information such as names of other users or concepts the user desires to search for.

Generally, a great portion of, or all of, the information accessible or visible to the user and other users via the user profile page is self-declared; that is, the user types or otherwise enters information or content in various sections or forms that may or may not automatically appear by default when the user profile page is created. In particular embodiments, a user may edit his or her user profile page at anytime the user is logged into social network environment 20. By way of example, user profiles include data that describe the respective users of the social network enabled by social network environment 20, which may include, for example, proper names (first, middle and last of a person, a trade name or company name of a business entity, etc.) biographic, demographic, and other types of descriptive information in a basic information section 402 under Info tab 401b. The basic information section 402 may further include a user's sex, current city of residence, birthday, hometown, relationship status, political views, what the user is looking for or how the user is using the social network (e.g., for looking for friendships, relationships, dating, networking, etc.), and the like.

In particular embodiments, a user profile page may also include a personal information section 406 where the user can enter more personal declarations. By way of example, a personal information section 406 may include a sub-section 408 in which the user may declare various activities he, she, or it participates in or enjoys such as, for example, sports or music. For example, in section 408, the user may declare these activities by, for example, simply listing the activities. For example, the user may list "weight lifting, hiking, playing pingpong, and foozball," or may use phrases such as, for example, "I enjoy weightlifting, I like hiking, I love playing pingpong, I'm good at foozball." The user may separate or delineate his or her declared activities (and other declarations described below) with, for example, commas, semicolons, dashes, or carriage returns (which may be recognizable by the typeahead or bootstrapping processes described below). An example personal information section 406 may also include a sub-section 410 in which the user may declare various interests. Again, the user may simply list such interests, such as by typing, for example, "reading and photography," or by using phrases such as, for example, "I like to read, I like photography." As another example, interests section 406 may include a favorite music sub-section 412 in which the user may declare music he or she likes or is interested in, a favorite TV shows sub-section 414, a favorite movies sub-section 416, a favorite books sub-section 418, a favorite quotations sub-section 420, and even a general "about me" sub-section 422 in which the user may enter general declarations about himself or herself that may not fit under the previously described sections.

In particular embodiments, a user profile page may also include a contact information section 424 in which the user may enter various contact information including, for example, email addresses, phone numbers, and city of residence. A user profile page may also include an education and work section 426 in which the user may enter his or her educational history. By way of example, a user may declare that he or she attended Stanford University in section 426 by, for example, simply typing "Stanford University," by typing "I attended Stanford University," or by selecting Stanford University from a menu interface. The user may also describe more specific information, such as, for example, the degree awarded, the field of the degree, the graduation date, etc. As another example, section 426 may enable the user to enter the user's work experience. By way of example, a user may declare that he or she works at company Z by, for example, simply typing "Company Z," by typing "I work at Company Z," or selecting company Z from a menu.

In particular embodiments, as will be described in more detail later, one or more terms in declarations entered in one or more of the previously described sections or sub-sections may be highlighted, rendered in a different color, underlined, or clickable. By way of example, one or more terms entered as declarations, and particularly terms matched to known concepts or existing concept nodes 304, may be associated with a hyperlink that, when clicked or otherwise selected, directs the user to a concept profile page devoted to the term and, in particular embodiments, having a name identical or similar to the declared term. By way of example, clicking on a hyperlink corresponding to "Family Guy" in favorite TV shows section 414 may direct the user to a web page (a concept profile page/hub as described below) devoted to the Family Guy TV show.

In particular embodiments, a user profile page also includes a friends section 428 (which may be visible in the chrome or other region of the page) that displays all or a subset of the user's friends as defined by edges in the social graph stored in social graph database 206. In particular embodiments, the user may click on a name or thumbnail image 429 associated with a friend resulting in the directing of the user to the user profile page of the selected friend. In particular embodiments, any action that a user takes with respect to another second user, whether or not the second user may be a friend of the user or not, and, in particular embodiments, actions that the user takes with respect to various concept nodes, may be displayed in a recent activity section 430, which may be viewable as a sub-section within a wall (feed) section 432 under Wall (feed) tab 401a. Generally, wall (feed) section 432 is a space on every user's profile page that allows the user and friends to post messages via input box 434 for the user and friends to see, as well as to comment or otherwise express themselves in relation to posts on the wall (feed).

In particular embodiments, the second set of un-administered nodes 304 are non-administered nodes that each correspond to a respective concept and a respective concept profile page (also referred to hereinafter as a "hub") devoted to the respective concept. In particular embodiments, un-administered nodes (also referred to as "concept nodes" or "hub nodes") 304 are nodes having respective concept profile pages (hubs) that are generally not administered by any one user; rather, in particular embodiments, hubs may generally be administered, created, and written and contributed to or modified by, at least in part, by any registered user of social network environment 20, including, in particular embodiments, users not having connections with the hub nodes 304 (that is, users whose user nodes 302 are not necessarily connected with the hub nodes 304 with edges in the social graph in social graph database 206). In a sense, hubs may be administered, or contributed to, by the community of registered users of social network environment 20. In particular embodiments, the second set of hub nodes 304 includes a first subset of un-administered nodes 304a that each correspond to a non-generic hub and a second subset of un-administered nodes 304b that each correspond to a generic hub. By way of example, a generic hub may be a hub devoted to an abstract activity such as running while a non-generic hub may be a hub devoted to a more specific concept, such as a profile page devoted to a particular club of runners. It should further be noted that, in various example embodiments, nodes 304a and 304b may or may not be classified distinctly as different node types; that is, in one embodiment, a hub node 304 may be identified as a generic hub node or a non-generic hub node based on the data stored with or within the data object corresponding to the hub node rather than by an explicit hub node type or sub-type.

Figure 5:
FIG. 5 illustrates an example concept profile page.

Similar to user profile pages, concept profile pages ("hubs") share information related to the concept associated with the corresponding hub node 304. In particular embodiments, any registered user logged in to social network environment 20 and viewing a hub may add content to the hub similar to a wiki-site. FIG. 5 illustrates an example hub for the movie, "The Shawshank Redemption." In an example embodiment, and as illustrated in FIG. 5, a hub may include sub-pages accessible via wall (feed) tab 501a, info tab 501b, photos tab 501c, and boxes tab 501d similar to a user profile page. A hub may also generally include a basic information section 502, a detailed info section 504, as well as, potentially, other sections, any and all of which may generally be filled in by any user viewing the hub (although in particular embodiments, there may be a time delay associated with a content approval or synchronization process before the user-generated or user-added content is visible in the hub) or, additionally or alternately, based on extracting information from external or third-party sources (e.g., WIKIPEDIA). A hub may also include a photo or picture section under photos tab 501c allowing users to upload images in or related to the concept, one of which may be selected as a profile picture 512 for the hub.

In particular embodiments, wall (or news feed/activities feed) section 501a, or other feed or activities section of the hub, displays comments, status updates, wall posts and other user activities associated with the user and friends of the user that are viewing the hub. The wall (or news feed/activities feed) section 501a, or other feed or activities section of the hub may also display comments, status updates, wall posts and other user activities and user generated content that are related to the concept for which the hub was created. More particularly, one or more processes within social networking environment 20 may perform a search on comments, status updates, wall posts and other user-generated content and user activities associated with the requesting user and friends of the requesting user filtered by concept; that is, a keyword search for keywords related to the concept of the currently requested or viewed hub (and potentially keywords related to the concepts associated with the recommended hubs) in these streams of user feeds or activities related to the requesting user and the requesting user's friends, and display this subset of user content or activities in the wall or feed section 501a of the currently requested or viewed hub. By way of example, U.S. patent application Ser. No. 12/704,400, filed 11 Feb. 2010, and titled REAL TIME CONTENT SEARCHING IN SOCIAL NETWORK, describes methods, processes, or systems for performing such searching, filtering, and displaying, and is hereby incorporated by reference herein. Wall or feed section 501a may also include a section, which may be a separate section from that just described, that displays comments, status updates, wall posts and other user activities of any and all users of social networking environment 20 that are related to the concept for which the hub was created, not just those of the user and friends of the user viewing the hub.

In particular embodiments, the default sections displayed in a particular hub upon creation of the hub may depend on the concept itself; that is, hub nodes 304 may be categorized by social network environment 20, and these categories (e.g., people, places, things, activities, sports, sports teams, celebrities, cities, locations, movies, actors, books, restaurants, etc.) may dictate, at least in part, which sections are displayed on a particular hub. By way of example, a movie hub may include a section or sub-section for entering actors starring in the movie, as illustrated in FIG. 5, as well as sections or sub-sections for entering information such as the director, writer, releasing studio, release date, etc. In particular embodiments, a hub also includes a section 508 (which, in particular embodiments, may be visible no matter which of tabs 501 are currently selected) that lists or displays users that have connections (and corresponding edges in the social graph) to or with the concept, such as a fans section 508 in the example illustrated in FIG. 5. By way of example, such users may have connections, and associated edges stored in social graph database 206, indicating, for example, that they like the movie, saw the movie, want to see the movie, acted in the movie, etc. In some embodiments, the users displayed in fans section 508 may only include users who are also friends with the user currently viewing the hub.

In particular embodiments, each hub also includes a recommendations section 510 (which, in particular embodiments, may be visible no matter which of tabs 501 are currently selected) that includes or displays a list or set of names 512, thumbnail images 514, or other identifiers associated with other hubs, each of which may include a hyperlink to the respective other hub. In particular embodiments, the hubs displayed or listed in recommendations section 510 have some determined relation to, or are determined based on leveraging information extracted from social graph database 206 about, one or more of: the particular user (also referred to hereinafter as the "requesting user") requesting or currently viewing the particular hub (also referred to hereinafter as the "requested hub"), the requested hub, friends of the user whose user nodes 302 may or may not also be connected to the requested hub's hub node 304 with respective edges, and other hubs having respective hub nodes 304 that are also connected to the requested hub's hub node 304. By way of example, the recommended hubs displayed in recommendations section 510 may include hubs that are liked or otherwise connected (with edges in social graph database 206) to friends of the requesting user (as defined by edges in social graph database 206), and particularly friends that are also connected to the requested hub (with edges in social graph database 206). As another example, the recommended hubs displayed in recommendations section 510 may include hubs that users, and particularly friends of the requesting user (as defined by edges in social graph database 206), also like or are otherwise connected to (with edges in social graph database 206), but who aren't necessarily connected with the requested hub (with edges in social graph database 206). As another example, the recommended hubs displayed in recommendations section 510 may include hubs that are connected to the requested hub (with edges in social graph database 206) and one or more friends of the requesting user (as defined by edges in social graph database 206). As another example, the recommended hubs displayed in recommendations section 510 may include hubs that are connected to the requested hub (with edges in social graph database 206) but that aren't necessarily connected with friends of the requesting user (as defined by edges in social graph database 206).

Figure 9:
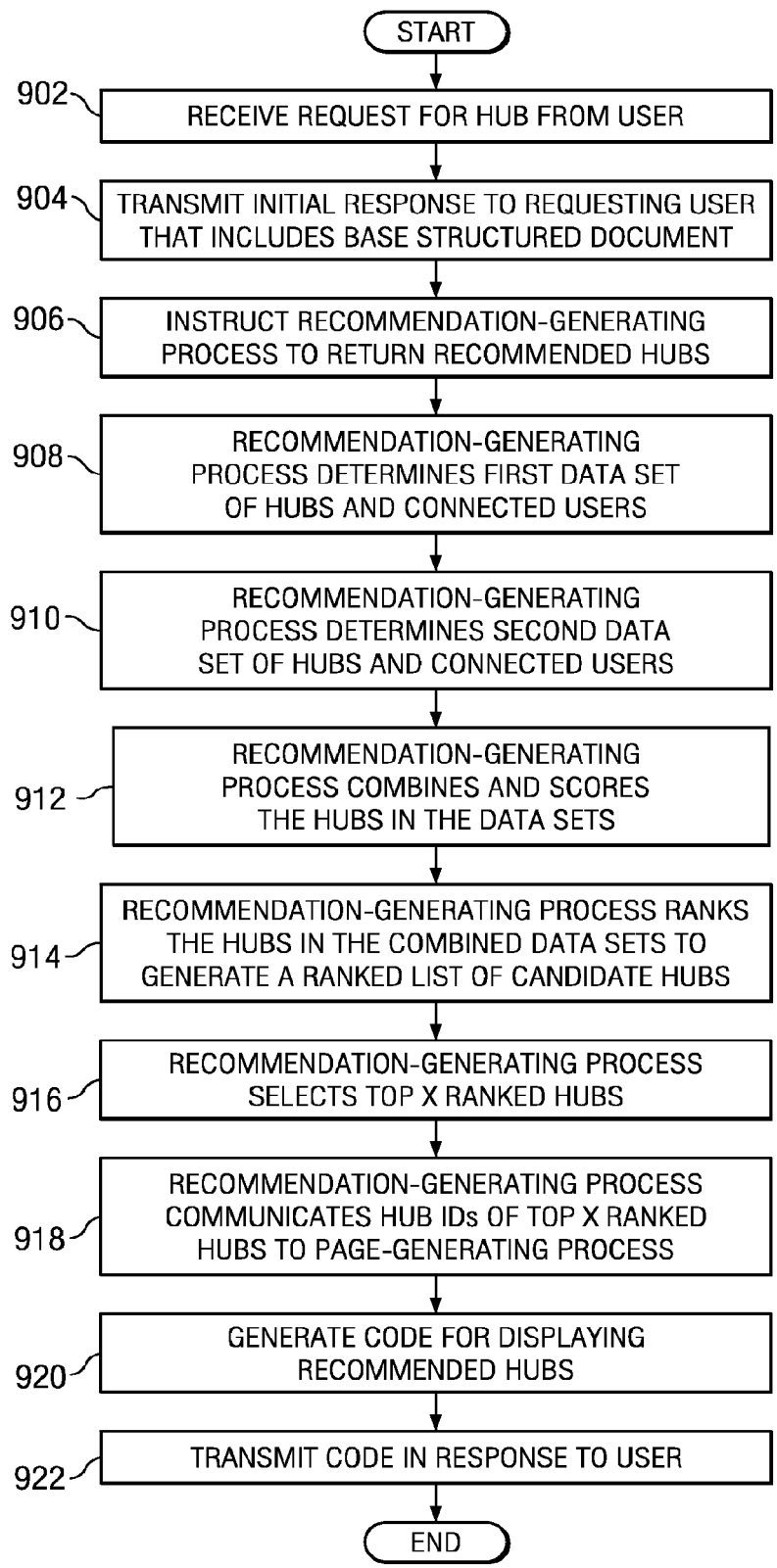
FIG. 9 shows a flowchart illustrating an example method for generating one or more recommendations for display to a user based at least in part on information extracted from a social graph.

By way of example, a recommendations section 510 for a hub corresponding to a movie may display hubs corresponding to movies that are directed by the same director, movies sharing some of the same actors, movies of the same genre, or movies liked by friends of the user, etc. FIG. 9, described in detail below, shows a flowchart illustrating an example method for generating one or more recommendations, and particularly recommended hubs, for display to a user currently viewing a hub based at least in part on information extracted from the social graph database 206. Generally, as described above, one goal or motivation for displaying recommended hubs to the requesting user currently viewing or requesting a particular hub is to provide the user with recommended hubs the user may be interested in viewing or interacting with and, furthermore, facilitate navigation to such recommended hubs from the currently viewed hub and, in particular embodiments, facilitate the creation of edges connecting the user to one or more of the recommended hubs the user demonstrates or indicates an interest in.

Figure 4C:
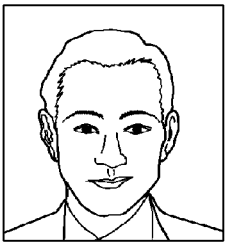
Figure 4D:
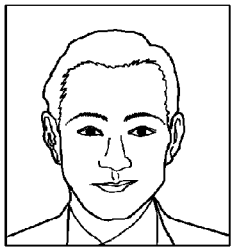

In particular embodiments, hub nodes 304 and their respective hubs may be explicitly created by users of social network environment 20 or generated automatically based on various criteria as described below with reference to the example flowcharts illustrated in FIGS. 6 and 7 and the example web pages illustrated in FIGS. 4C-4D. In particular embodiments, hubs and their respective hub nodes 304 may be of two varieties such as, for example, whether or not they are considered or classified as generic or non-generic. In one particular implementation, hubs and their respective hub nodes 304 may be "locked" or "un-locked." Hubs may be locked at the time of creation, or other suitable time, by, for example, the creator or an administrator of social network environment 20. As described above, hubs are essentially community owned, and hence, in particular embodiments, any user of social network environment 20 may edit (e.g., add content or declarations to) hubs. However, in particular embodiments, edits in un-locked hubs may "go live" (become visible to the user or other users viewing the hub) immediately while edits in locked hubs may require approval by trusted users or administrators before being modified and presented publicly to users. Additionally, it should be noted that, in some embodiments, social network environment 20 may track which users added which content to hubs as well as when these users added the respective content.

It should also be noted that, in particular embodiments, social network environment 20 provides means or processes (e.g., selectable links or user interfaces) for the true voices of hubs corresponding to hub nodes 304 (or un-authenticated user profile pages corresponding to un-authenticated user nodes 302*b*), such as the actual celebrity or business for which a hub node 304 has previously been created, to claim these nodes thereby assuming administrative rights over them and redefining them in the social graph as, for example, registered authenticated user nodes 302*a* (or, alternately, as authenticated hub nodes 304).

As illustrated in FIG. 3, user nodes 302 and hub nodes 304 stored in social graph database 206 may be connected with one another via edges. As described above, in some embodiments, each edge may be classified or characterized by an edge type of a plurality of edge types that define, indicate, or characterize the connection between the pair of nodes connected by the edge. By way of example, user nodes 302 may be connected with one another via edges 306 of a first edge type. In particular embodiments, edges 306 define friendship or other social relationship connections between users (e.g., friends) associated with the respective user nodes 302. Additionally, user nodes 302 may be connected with concept nodes 304 via edges 308 of one or more second edge types. By way of example, a user corresponding to a user node 302 may make a declaration or otherwise indicate that he or she likes, is a fan of, wants, or otherwise has an interest in or association with a concept corresponding to a particular hub node 304. The user may indicate this like or interest via clicking a link on the corresponding concept node's hub or by other suitable means, such as for example, clicking a link in the user's home or profile page in response to an invitation, clicking a link in a friend's profile page, or, in particular embodiments, by some automatic or automated means.

Figure 6:
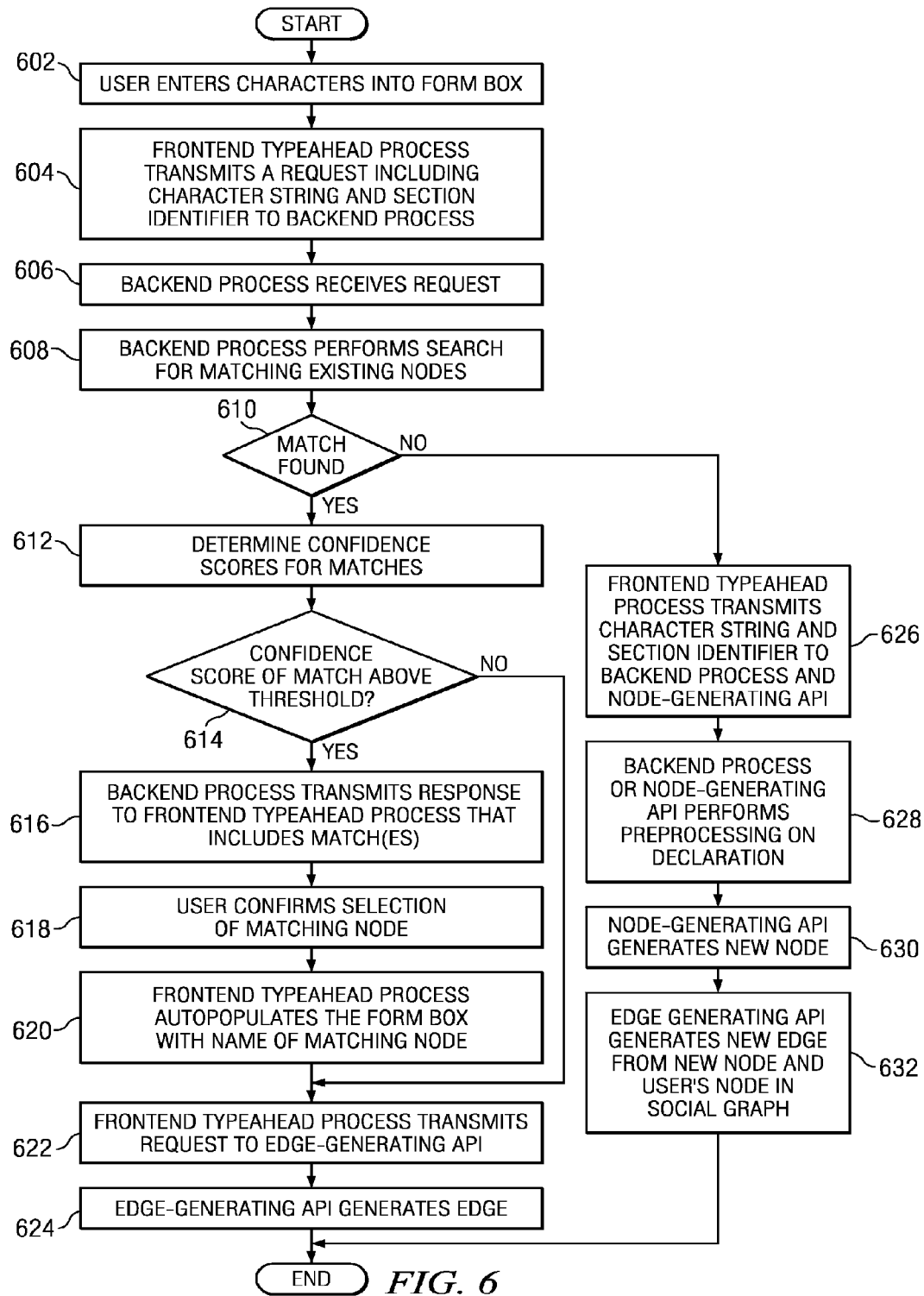
FIG. 6 shows a flowchart illustrating an example method for automatically generating nodes and edges based on information currently being entered by a user of a social network environment.
Figure 7:
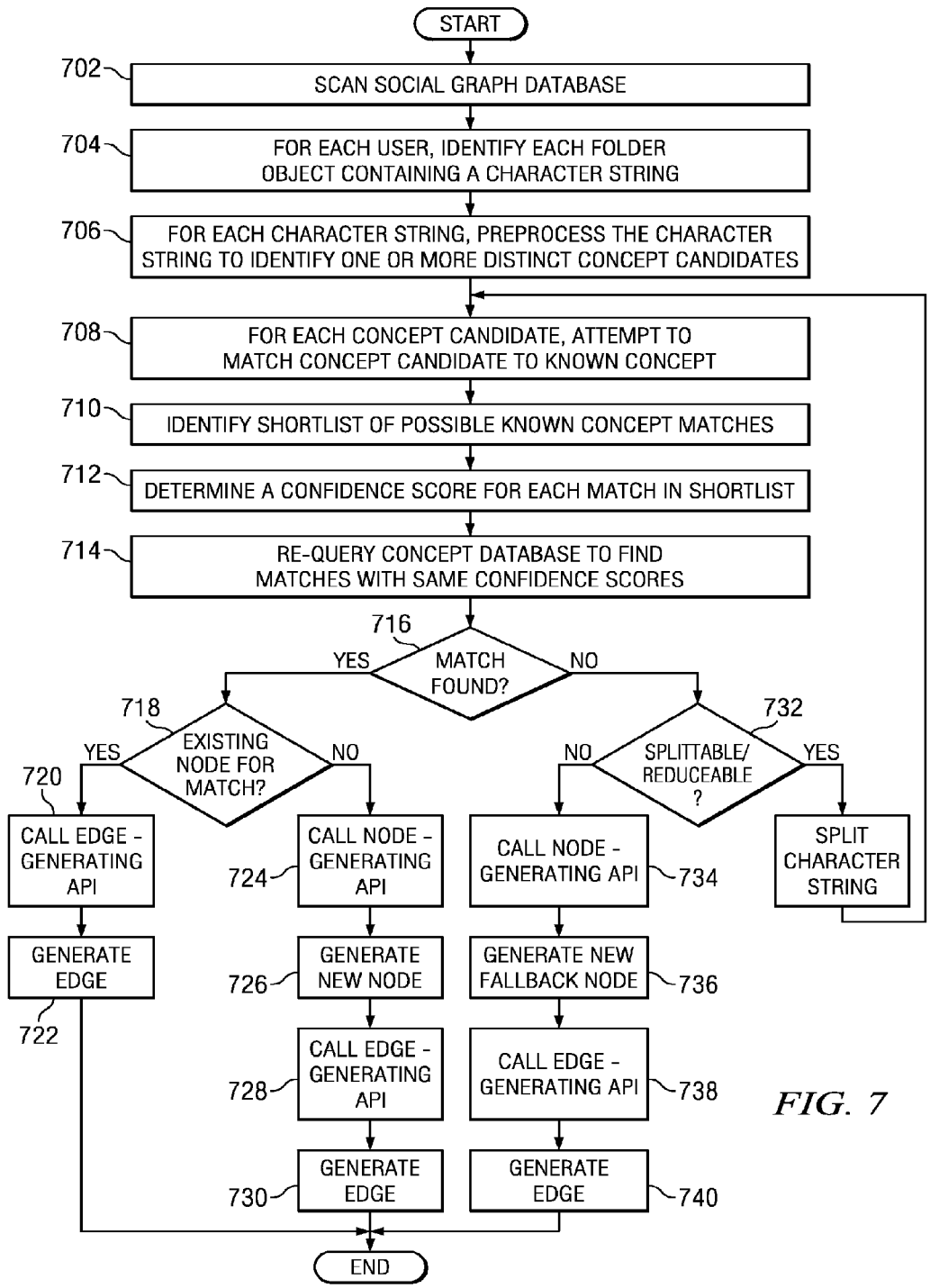
FIG. 7 shows a flowchart illustrating an example method for automatically generating nodes and edges based on information previously entered by users of a social network environment.

By way of example, as will be described in more detail below, FIG. 6 illustrates an example method for automatically generating nodes and edges based on information currently being entered by a user of a social network environment, while FIG. 7 illustrates an example method for automatically generating nodes and edges based on information previously entered by users of a social network environment. More particularly, for example, an edge to an existing hub node 304 (or other user node 302) may be automatically created as a result of matching information currently being entered by a user such as, for example, as the user is typing or otherwise entering a declaration in, for example, the user's profile page, as well as by mining information previously entered by a user in, for example, the user's profile page. As a result an edge 308 may be defined and stored in social graph database 206 indicating the particular form of the connection and the nodes connected by the edge. Furthermore, as will be described below, in cases in which the mined or currently entered information doesn't match an existing node stored in social graph database 206, a new node may be created in social graph database 206 as well as a new edge from the respective user's node to the new node.

Furthermore, in some embodiments, various hub nodes 304 may be connected with one another in social graph database 206 via edges 310 of a third edge type. This third edge type may define an informational or categorical relationship between hub nodes 304, some of which may tend to organize such hubs into hierarchies. By way of example, a generic hub devoted to Asian food may have a link in the page to various Asian restaurants or review pages displayed in non-generic hubs. As such, in the social graph, edges 310 may connect the generic Asian food hub to one or more other generic hubs or non-generic hubs.

Additionally, in some embodiments, each edge type may include a plurality of edge sub-types that add more detail or metadata describing the specific type of connection between corresponding pairs of nodes. Furthermore, in some embodiments, new edge types may be defined or generated automatically or dynamically. By way of example, information entered into, or in relation to, third party web applications may cause new edge types to be defined and generated. As a particular example, a web application for Netflix may result in an edge type that signifies "movies I want to see."

In such embodiments in which edges have or are assigned associated edge types, the edge itself may store, or be stored with, data that defines a type of connection between the pair of nodes the edge connects, such as, for example, data describing the types of the nodes the edge connects (e.g., user, hub, category or classification of hub), access privileges of an administrator of one of the pair of nodes connected by the edge with respect to the other node the edge connects to (e.g., read or write access of an administrator of one node with respect to the other node connected by the edge), or data describing how or why the edge was first initialized or created (e.g., in response to an explicit user action or declaration, or automatically without an explicit user action), the strength of the connection as determined by various factors or criteria related to or shared by the nodes (or more particularly the users or concepts associated with the respective connected nodes) connected by the edge, among other suitable or relevant data.

In an alternate embodiment, each edge may simply define or represent a connection between nodes regardless of the types of nodes the edge connects; that is, the edge itself may store, or be stored with, identifiers of the nodes the edge connects but may not store, or be stored with, data that describes a type of connection between the pair of nodes the edge connects. Furthermore, in any of these or other embodiments, data that may indicate the type of connection or relationship between nodes connected by an edge may be stored with the nodes themselves. In particular embodiments, the edges, as well as attributes (e.g., edge type and node identifiers corresponding to the nodes connected by the edge), metadata, or other information defining, characterizing, or related to the edges, may be stored (e.g., as data objects) in social graph database 206 and updated periodically or in response to various actions or factors (e.g., as a user interacts more with a hub, the edge connecting the respective user and hub nodes may be updated to reflect this interaction, which may then contribute to an affinity or connection strength score characterizing the edge as described in more detail below).

In particular embodiments, social network environment 20 may leverage information extracted from both user nodes 302 as well as hub nodes 304 for various purposes or to implement or augment various existing or new features. Additionally, as a hub node 304 is populated with information entered or contributed by various users, other hub nodes 304 and respective hubs may be generated based on such information as described below. Furthermore, hubs may provide value to users in a number of manners. By way of example, if a first user visits a particular hub, the user may discover that various ones of the user's friends are also connected to that hub. The first user may also easily determine what other hubs those friends are connected to. Social network environment 20 may also correlate this information about the user and the user's friends to find, for example, overlapping interests or attributes, which may then be used to generate other hubs, used to generate targeted advertisements, or to make recommendations to users, such as recommended hubs, as described above and described in more detail below with reference to the flowchart shown in FIG. 9.

FIG. 6 shows a flowchart illustrating an example method for automatically generating edges to existing hub nodes 304 (or user nodes 302) as well as generating new hub nodes 304 and edges from user nodes 302 (or hub nodes 304) to these newly generated hub nodes 304 based on information currently being entered by users of social network environment 20. In particular embodiments, the automatic generation of hubs and edges is based on data, and particularly text, such as for example, declarations entered in the sections of user profile pages or hubs described above, as well as, in some embodiments, information entered in other sections or forms of web pages hosted by social network environment 20, including internal or external (e.g., third party) web applications, messages sent between users, or wall (feed) postings. In an example implementation, when a registered user of social network environment 20 first requests a web page from social network environment 20 in a given user session, the response transmitted to the user's client device 30 from social network environment 20 may include a structured document for rendering a login page at the client device. The user may then enter his or her user login credentials (e.g., user ID and password), which are then transmitted from the user's client device 30 to social network environment 20. Upon successful authentication of the user, social network environment 20 may then transmit a response to the user's web browser 202 at the user's client device 30 that includes a structured document for rendering a user homepage or user profile page at the user's client device. In particular embodiments, this or a subsequent response may further include one or more executable code segments (e.g., JavaScript) that, when received by the user's client device 30, implement a frontend (client-side) typeahead process 204 that executes in conjunction with the user's web browser 202 or other client-side document rendering application, as illustrated in FIG. 2B.

In particular embodiments, as a user types or otherwise enters text into a form used to add content or make declarations in various sections of the user's profile page or other page, the frontend typeahead process 204 works in conjunction with one or more backend (server-side) typeahead processes 208 (hereinafter referred to simply as "backend typeahead process 208") executing at (or within) the social network environment 20 (e.g., within servers 22), as illustrated in FIG. 2B, to interactively and virtually instantaneously (as appearing to the user) attempt to auto-populate the form with a term or terms corresponding to names of existing hubs, or terms associated with existing hubs, determined to be the most relevant or best match to the characters of text entered by the user as the user enters the characters of text. Utilizing the social graph information in social graph database 206 or information extracted and indexed from social graph database 206, including information associated with nodes as well as edges, the frontend and backend typeahead processes 204 and 208, in conjunction with the information from social graph database 206, as well as potentially in conjunction with various others processes, applications, or databases located within or executing within social network environment 20, are able to predict a user's intended declaration with a high degree of precision. However, social network environment 20 also provides user's with the freedom to enter any declaration they wish enabling users to express themselves freely. As such, social network environment 20 enables the creation of new hubs and corresponding hub nodes 304 related to virtually any concept.

Referring back to FIG. 4A, in particular embodiments, a user may edit his or her user profile page and make declarations by clicking or otherwise selecting an edit link 440 corresponding to the section that the user desires to edit or make a declaration. By way of example, FIG. 4C illustrates the resultant rendered web page displayed to the user at the user's client device 30 after the user has selected the edit link 440 corresponding to the personal information section 406. As shown in FIG. 4C, a plurality of form boxes 409, 411, 413, 415, 417, 419, 421, and 423 are rendered enabling the user to type or otherwise enter declarations into corresponding sections 408, 410, 412, 414, 416, 418, 420, and 422, respectively. As described above, as the user enters text characters into a form box, the frontend and backend typeahead processes 204 and 208 attempt to identify existing hub nodes 304 (or user nodes 304, e.g., especially user nodes corresponding to celebrities, businesses, or organizations) that match the string of characters entered in the user's declaration as the user is entering the characters.

More particularly, referring to FIG. 6, as the user enters characters into a form box at 602, the frontend typeahead process 204 reads the string of entered textual characters and, in particular embodiments, as each keystroke is made, the frontend typeahead process 204 transmits the entered character string as a request (or call) at 604 to the backend typeahead process 208 executing within social network environment 20. In particular embodiments, the frontend and backend typeahead processes 204 and 208 may communicate via AJAX (Asynchronous JavaScript and XML) or other suitable techniques, and particularly, asynchronous techniques. In one particular embodiment, the request is, or comprises, an XMLHTTPRequest enabling quick and dynamic sending and fetching of results. In particular embodiments, the frontend typeahead process 204 also transmits before, after, or with the request at 604 a section identifier (section ID) that identifies the particular section of the particular page in which the user is making the declaration. In some embodiments, a user ID parameter may also be sent, but this may be unnecessary in some embodiments, as the user is already "known" based on he or she logging into social network environment 20. It should also be noted that, although these and other steps of FIG. 6 may be described as occurring as "single steps" and in a particular order, it should be appreciated that, since the frontend typeahead process 204 may continue to transmit strings of characters to social network environment 20 as each keystroke is entered by the user, steps 602 and 604, and other steps described below, may generally be repeated numerous times and potentially in parallel as a user is entering a declaration or other information.

In particular embodiments, as the backend typeahead process 208 receives requests or calls at 606 including a string of user-entered character data and section identifier, the backend process 208 performs, or causes to be performed (e.g., in conjunction with one or more other search processes executing at social network environment 20), a string search at 608 to identify existing nodes, and particularly hub nodes 304, having respective names or other hub identifiers matching the entered text, and in particular embodiments, matching a particular category of nodes in social graph database 206 as determined, at least in part, by the particular section identifier. In various example embodiments, the granularity of the categories may vary. By way of example, in some embodiments, hubs corresponding to actors, directors, producers, movie types or genres, may all be grouped in a "movie" category while in other embodiments, each of these examples may represent their own category. Similarly, in some embodiments, hubs corresponding to football, basketball, soccer, rugby, and tennis may all be grouped in a "sports" category while in other embodiments, each of these may represent their own category. In one embodiment, the backend typeahead process 208 performs string matching; that is, the backend typeahead process 208 attempts to match the latest string of characters received from the frontend typeahead process 204 to an index of strings each corresponding to a name of a node in social graph database 206. In particular embodiments, the index of strings is updated periodically or as nodes 302 and 304 are added to the social graph database 206 or other index generated from social graph database 206. The backend typeahead process 208 may use one or more of a variety of factors when attempting to match the string of entered text and as such may examine one or more of a variety of different aspects or attributes of existing nodes in social graph database 206. By way of example, in addition to attempting to match the entered text to names (name strings) of existing nodes, the backend typeahead process 208 may use the section identifier to determine a category of the declaration which may be then used to search a subset of existing hub nodes 304 associated with the category. In particular embodiments, backend typeahead process 208 searches or queries an index of nodes generated from social graph database 206 in which the nodes are indexed and searchable (or queryable) by hub category. The backend typeahead process 208 may also use information about the user entering the text including information entered in the user's profile page, information about the users friends, information about other hub nodes 304 the user is connected with, etc. in order to best match a user declaration to an existing concept and respective hub node 304 (or user node 302). The backend typeahead process may also attempt to correct spellings or match to synonyms of the user-entered characters or extrapolations of entered characters.

In particular embodiments, the backend typeahead process 208 may use one or more matching algorithms to attempt to identify matching nodes. In particular embodiments, when a match or matches are found at 610, the backend typeahead process 208 may transmit a response (which may utilize AJAX or other suitable techniques) to the user's client device at 616 that may include, for example, the names (name strings) of the matching nodes as well as, potentially, other metadata associated with the matching nodes. By way of example, FIG. 4D illustrates the result of the user entering the characters "wei" into form box 409 corresponding to activities section 408. In the example illustrated in FIG. 4D, the frontend typeahead process 204 displays a drop-down menu 442 that displays names of matching existing hubs and respective hub nodes 304 (e.g., a hub named or devoted to "weight lifting"), which the user can then click on or otherwise select thereby confirming at 618 the desire to declare the matched concept name corresponding to the selected node. By way of example, upon clicking "weight lifting," the frontend typeahead process 204 auto-populates, or causes the web browser 202 to auto-populate, the form box 409 with the declaration "weight lifting" at 620. In an alternate embodiment, the frontend typeahead process 204 may simply auto-populate the form with the name or other identifier of the top-ranked match rather than display a drop-down menu. In such an embodiment, the user may confirm the auto-populated declaration simply by keying "enter" on his or her keyboard or by clicking on the auto-populated declaration.

In particular embodiments, upon user confirmation of the matching node, the frontend typeahead process 204 may transmit at 622 a request to the backend typeahead process 208 that informs the backend typeahead process of the user's confirmation of the matched hub. In particular embodiments, in response to the request transmitted at 622, the backend typeahead process may automatically (or alternately based on an instruction in the request) call or otherwise instruct an edge-generating API (Application programming interface) 210 to create, at 624, an edge in the social graph stored in social graph database 206 between the particular user's node 302 and the particular node (generally a hub node 304, but in some embodiments, possibly a user node 302) corresponding to the confirmed declaration. In an alternate embodiment, the request transmitted at 622 may not be generated and transmitted by the frontend typeahead process 204 until the user has selected the save changes (or other submit) button 444 indicating confirmation of the user's desire to make the declaration (or declarations made in any and all of the displayed form boxes).

In particular embodiments, the node types (e.g., 302a, 302b, 304a, and 304b) or categories of existing nodes as, for example, determined based, at least in part, on the section category as identified by the corresponding section identifier for the section in which the declaration was made (e.g., favorite movies) or based on social graph information stored in social graph database 206, are used by the backend typeahead process 208 to better match a string of entered characters of a declaration to existing nodes that may be candidates for matching nodes. By way of example, consider an example in which a user types "jaguar" into a user profile section. In such an example, the backend typeahead process 208 may identify numerous existing hubs having corresponding names that at least include the name "jaguar," or a derivation thereof (e.g., "jaguars"). For example, the backend typeahead process 208 may identify a hub node 304 devoted to the jungle cat jaguar. The backend typeahead process 208 may also identify a hub node 304 devoted to the Jacksonville Jaguars professional football team and still another hub node 304 devoted to the Jaguar luxury and performance car-maker. In such cases, all of these three hub nodes may be matched at 610 by the backend typeahead process and hence, all three hub names may be transmitted at 616 in some embodiments, while in other embodiments, the backend typeahead process 208 may only transmit one matching hub node name that is determined to be the most relevant based, for example and as described above, on using the section ID or other parameters extracted from the user's profile to determine a category in which the most relevant matching hub node 304 would be indexed in.

Additionally, in some embodiments, as described below with reference to FIG. 9, other factors may also be used to determine the strength or relevancy of the matching hub nodes 304 including, by way of example, the number of the user's friends having respective user nodes 302 connected with a matching hub node 304, the number of total users having respective user nodes 302 connected with a matching hub node 304, the number of other hub nodes 304 connected with the matching hub node 304, information obtained by analyzing other hub nodes 304 connected to both the user's node 302 and a matching hub node 304, or other hub nodes 304 connected to nodes 302 corresponding to friends of the user as well as to a matching hub node 304. Moreover, as described below, information characterizing the strength of the connections associated with the edges connecting any of these nodes may also be used to weight their relevancy in determining the most relevant matching hub node or nodes 304.

In particular embodiments, there are at least one or two determinations that are made by the backend typeahead process 208 before the frontend typeahead process 204 auto-populates a form box with names corresponding to matched hubs and respective hub nodes 304 (or user nodes 302). First, considering the above example, in the case that a plurality of matches to existing nodes are identified at 610, the backend typeahed process may then determine at 612 a confidence score for each of the matches that indicates an absolute or relative quality of each of the names of the matching nodes, the quality of the matching nodes themselves, or otherwise a level of confidence that the backend process 208 has that the match is correct (the intended concept the user was entering or trying to enter). This determination at 612 may also result or involve a ranking of the matches (which may be reflected in the order of the matches displayed in the drop-down menu 442).

One or more of numerous factors may be used to determine a confidence score, quality, or ranking of a matching node. By way of example, such factors may again include, as just described, the number of the user's friends having respective user nodes 302 connected with a matching hub node 304, the number of total users having respective user nodes 302 connected with a matching hub node 304, the number of other hub nodes 304 connected with the matching hub node 304, information obtained by analyzing other hub nodes 304 connected to both the user's node 302 and a matching hub node 304, or other hub nodes 304 connected to nodes 302 corresponding to friends of the user as well as to a matching hub node 304. Other suitable factors may also include the number of sections on the corresponding candidate matching hub that are filled in, the relationship of content displayed on the hub corresponding to the matching hub node to the content, including other declarations, displayed on the user's profile page, etc. Again, as described below, information characterizing the strength of the connections associated with the edges connecting any of these nodes may also be used to weight their relevancy in determining the most relevant matching hub node or nodes 304. Referring back to the jaguar example, the backend typeahead process 208 may identify another declaration of the user that says "I love watching football," and as such, based on this identification (as well as other factors), the backend typeahead process 208 may rank the node corresponding to the Jacksonville Jaguars professional football team as the best match and the frontend typeahead process 204 may list the name of this node at the top of the drop-down menu or automatically auto-populate the form with the name.

In particular embodiments, the backend typeahead process 208 may then make a second determination 614 before the frontend typeahead process 204 auto-populates a form box with names corresponding to ranked matched nodes. By way of example, based on the confidence scores, which may have been determined at 612, one or both of the frontend and backend typeahead processes 204 and 208 may determine whether there is a determined level of certainty or confidence (a confidence score) for each match before the match is displayed to the user in the form of a drop-down menu for selection or auto-populated in the form box. That is, in particular embodiments, even though one or more matches have been identified from the existing nodes in the social graph database 206, their respective certainties (in being the actual concept the user was intending to declare) as demonstrated by their determined confidence scores may be below a first predetermined threshold, and hence, none of the matches may be displayed to the user and be auto-populated by the frontend typeahead process 204. That is, rather than display and provide the user with the match or matches having confidence scores below the threshold, the frontend typeahead process 204 may allow the user to finish typing the declaration himself or herself, and then transmit the request at 622. The backend process 208 may determine the best match corresponding to the user's declaration and proceed with calling the edge-generating API 210 to which it passes information about the user's node and information about the existing node to the best matching node, resulting in the creation of an edge at 624 between the user's node and the best matching node in the social graph database 206.

In alternate embodiments, determining a confidence score of each match may be performed as a part of the searching step 608 or determination step 610. In such embodiments, the determination of whether a match or matches have been found may be based on comparing respective confidence scores determined for the prospective matches with a second predetermined threshold below the first predetermined threshold described above. That is, the second predetermined threshold may be used when determining if a match is found while the first predetermined threshold may be used when determining if the match should be auto populated for display to the user.

In particular embodiments, the edge type of the edge created by the edge-generating API at 624 is based on one or more of the section category as identified by the corresponding section identifier for the section in which the declaration was made, or the category of the confirmed matched hub as determined by the backend process based on social graph information stored in data store 24. By way of example, consider another example in which a user is making a declaration about Stanford University. Also consider, for this example, that there is an existing hub node 304 devoted to Stanford University. A first example user may enter a declaration that he or she attends or attended Stanford University as a student thereby resulting in the creation of an edge of one edge type or sub-type from the first user's node 302 to the hub node 304 for Stanford University. A second example user may enter a declaration that he or she teaches or taught at Stanford University thereby resulting in the creation of an edge of another edge type or sub-type from the second user's node 302 to the hub node 304 for Stanford University. Still further, a third example user may enter a declaration that he or she likes or is a fan of Stanford University thereby resulting in the creation of an edge of another edge type or sub-type from the third user's node 302 to the hub node 304 for Stanford University. Thus, in this example, the type of edge created by the edge-generating API may be based on a word or words, and particularly a verb (e.g., attends, teaches, likes, etc), entered with the declaration but not part of the node name. Hence, in general and as evidenced by this example, a multitude of factors may be used in, first, finding a matching node, and second, determining the appropriate edge type between the user's node and the matching node, including the section identifier, the words used in the declaration, and information about the user.

In particular embodiments, if no suitable match is identified at 610 to a predetermined level of certainty (e.g., based on comparison of confidence scores with the second threshold), or the user abstains from selecting a provided or autopopulated match, then, as the user continues to enter characters of text in a declaration, the frontend typeahead process 204 waits until the user is finished entering the declaration as, for example, indicated by the user clicking or otherwise selecting the save changes button 444, before transmitting the character string, section identifier, or other information/data at 626 to backend typeahead process 208, which then calls a node-generating API 212 (which may include or be a part of the edge-generating API 210 described above) to which the backend typeahead process 208 passes the character string, section identifier, or other information/data. The backend typeahead process 208 or node-generating API 212 may perform some pre-processing at 628 before generating a new node (e.g., generally a hub node 304). By way of example, assuming the user entered "I love climbing in northern California" in, for example, form box 409 corresponding to activities section 408 of his or her user profile page. While the backend process 208 may or may not have found matching existing hubs for some of the terms in the user's declaration (e.g., "climbing, California," etc.), the backend process may determine that the qualities or confidence scores associated with these individual matched nodes are lower than the second predetermined threshold and that no existing nodes exist for the more particular declaration "I love climbing in northern California," and hence, backend typeahead process 208 may determine that a new node should be created; that is, a concept node 304 for, and named, "I love climbing in northern California." The node-generating API 212 then generates the new node (a hub node 304 in this example) and a corresponding hub (with appropriate default sections) at 630. The edge-generating API 210 may then create an edge between the new node and the user's node at 632 in social graph database 206. As mentioned above, the backend typeahead process 208 or node-generating API 212 may perform some pre-processing at 628 before generating a new node. For example, the node-generating API may attempt to correct misspellings, remove delimiters (e.g., commas), remove articles (e.g., "a," "the," "and," etc.), or remove other words including verbs. By way of example, such processing may result in the creation of a new node simply called "Climbing in northern California," as opposed to "I love Climbing in northern California." Such preprocessing may also be performed before or during the matching step at 610 to facilitate the identification of true matches.

In particular embodiments, similar typeahead processes can be used to create edges between existing hub nodes 304 as well as to create new hub nodes 304 and edges from existing hub nodes 304 to such new hub nodes 304 as users "fill-in" and otherwise upload content to hubs corresponding to existing hub nodes 304.

FIG. 7 shows a flowchart illustrating an example method, implemented at least in part by a "bootstrapping feature" or "bootstrapping process" 214, for automatically generating edges to existing hub nodes 304 (or user nodes 302) as well as generating new hub nodes 304 and edges from user nodes 302 (or hub nodes 304) to these newly-generated hub nodes 304 based on information previously entered by users of social network environment 20, as well as, in some embodiments, information obtained from one or more internal or external information sources or data repositories. In contrast to the typeahead processes 204 and 208 described with reference to the flowchart of FIG. 6, which may be considered "online" processes in that these typeahead process execute when a user is logged into social network environment 20, the bootstrapping process 214 described with reference to the flowchart of FIG. 7 may be considered an "offline" process in that it may execute at anytime whether or not any users of social network environment 20 are logged on. In particular embodiments, the reason for this difference is that the generation of nodes and edges based on previously entered information may, in one embodiment, only be performed once over all users and existing nodes of the social network environment 20. In such an embodiment, after the bootstrapping process 214 has processed all the desired information from all the desired users or concepts associated with existing nodes and generated new nodes and edges based on the processed information, the typeahead processes 204 and 208 described above with reference to FIG. 6 may then be used to generate any new nodes and edges.

In particular embodiments, the automatic generation of hubs and edges as a result of executing the bootstrapping process 214 is based on data, and particularly text, such as for example, declarations entered in the above-described sections of user profile pages or hubs, as well as, in some embodiments, information entered in other sections or forms of web pages hosted by social network environment 20, including internal or external (e.g., third party) web applications, messages sent between users, wall (feed) postings, and generally, any form, communication, or feed in which text has been entered.

In particular embodiments, the method begins at 702 with bootstrapping process 214 scanning data structure 24, including social graph database 206, for text entered or otherwise associated with or stored with each user of social network environment 20. As described above, all of the information about or associated with a given user including that entered and displayed with the user's profile page may be stored with the user's node 302 in social graph database 206. In particular embodiments, for each user (but also, in some embodiments, potentially each hub having a corresponding hub node 304), bootstrapping process 214 identifies all of the fields or objects associated with the user's node 302 that contain textual characters at 704. As described above, such fields may include any of sections 408, 410, 412, 414, 416, 418, 420, and 422 in the user's profile page as well as, in some embodiments, text in private messages sent between the user and other users, public messages posted in wall (feed) sections, status updates, captions below photos, etc.

In particular embodiments, for each field or object containing text, bootstrapping process 214 performs, at 706, some amount of pre-processing of the text. By way of example, in particular embodiments, all the text in a given field is considered a single character string. In particular embodiments, pre-processing of the character string at 706 includes applying a set of one or more heuristic rules to parse, separate, or delimit the character string into separate words or phrases associated with distinct concept candidates. More particularly, pre-processing may involve bootstrapping process 214 separating the character string in a given field by delimiters (e.g., commas, semicolons, carriage returns, etc.). By way of example, the character string illustrated in section 408 of FIG. 4A may be delimited into four distinct concept or hub candidates, the first distinct hub candidate being "weight lifting," the second distinct hub candidate being "hiking," the third distinct hub candidate being "playing ping pong," and the fourth distinct hub candidate being "foozball." Pre-processing at 706 may additionally involve identifying synonyms of the word or words in each distinct hub candidate, identifying words that may be misspelled, identifying the potentially correct spellings, expanding phrases or adding words to phrases (e.g., words that may have been unintentionally left out or left our as a result of brevity), removing URLs, removing metadata, normalizing the word or words based on language (e.g., converting words from the language in which they were entered into the language typically used by the user, or converting words from the language in which they were entered into the language in which a best match for the hub candidate is likely to be found), and the like. By way of example, consider that a user may have entered "Godfather I, II, III" in a favorite movies section 416. In particular embodiments, bootstrapping process 214 possesses the intelligence or capability to identify that the user has actually identified three movies: The Godfather part I, The Godfather part II, and The Godfather part III. In such a case, the bootstrapping process 214 may consider each movie as a separate hub candidate as though the user had explicitly typed out all three movie names.

In particular embodiments, each identified distinct hub candidate (e.g., a string of characters) may then, at 708, be matched to or compared with a list of known concepts using one or more of a variety of suitable string matching algorithms. In particular embodiments, the known concepts with which the hub candidates are compared may be indexed in the form of corresponding strings of characters and stored in concept database 216. Generally, concept database may be an indexed repository of concept information that bootstrapping process 214 can query against for matching candidate hubs to known concepts. That is, in particular embodiments, it is desired to match each hub candidate with a single known concept. In particular embodiments, concept database 216 may be populated with known concepts by crawling one or more external information sources or data repositories such as, for example, by crawling WIKIPEDIA (www.wikipedia.org) or FREEBASE (www.freebase.com) and combining these crawling results with each other, as well as, potentially, information extracted from one or more internal information sources, including social graph database 206. In one example embodiment, the concepts indexed and stored in concept database 216 don't necessarily have corresponding existing hub nodes 304 (or user nodes 302) in social graph database 206. That is, concept database 216 may generally store an index of known concepts (each represented by corresponding character string), as well as information about these concepts (which may be crawled from an external data source such as those just described), but not all of these known concepts may have corresponding existing hub nodes 304 stored in social graph database 206. In an alternate embodiment, concept data base 216 may include social graph database 206 or vice versa. In particular embodiments, to facilitate the matching of hub candidates to known concepts indexed in concept database 216, the index of known concepts in concept database 216 may be organized into categories such as, by way of example and not by way of limitation, people, places, things, activities, sports, sports teams, celebrities, cities, locations, movies, books, restaurants, etc. The particular categories searched by bootstrapping process 214 may be determined by a section ID or other field identifier associated with where the hub candidate was identified.

In particular embodiments, as a result of pre-processing at 706, each hub candidate may have associated with it, one or more character strings that are each attempted to be matched with known concepts in concept database 216. By way of example, the delimited character string corresponding to the user's entered text may be matched at 708 as well as other character strings in which spelling changes, word additions, work removals, among other changes have been made. In particular embodiments, bootstrapping process 214 then identifies, at 710, a "shortlist" of the best matching known concepts matching the hub candidate. In particular embodiments, bootstrapping process 214 then generates or determines, at 712, a confidence score or value for each match in the shortlist (similarly to the confidence score described with reference to the typeahead processes and the flowchart of FIG. 6). By way of example, the confidence score for each known concept may be based on one or more of the following: a determination of how well the text in the character string of the hub candidate matched the text in the character string of each known concept, whether the spellings of any of the words in the hub candidate character string were changed to obtain the match, whether any words were added or removed in the hub candidate character string to obtain the match, etc.

As an example, when a shortlist of potential candidates is identified, in one embodiment, the shortlist is narrowed further by using other information known about the user. Consider a user A who wrote declared "Twilight, Harry Potter." If bootstrapping process 214 could not unambiguously identify the movie corresponding to "Twilight," (e.g., because there are multiple movies with the word "twilight"), bootstrapping process 214 may use the fact that many other users who like "Harry Potter" also like the movie "Twilight: New Moon" (an unambiguous movie), and therefore determine that user A is referring to "Twilight: New Moon" with a sufficient degree of certainty when user A has typed "Twilight." Similarly, bootstrapping process 214 could use demographic information about the user. For example, an older user may prefer the 1958 version of "Romeo and Juliet," whereas a younger user may be more likely to mean the newer version of "Romeo+Juliet" released in 1996.

In particular embodiments, bootstrapping process 214 then re-queries the concept database 216 at 714 to find matches having the same confidence scores as the matches in the shortlist of matches. One motivation to do this second round of matching is to eliminate the possibility of false positives. By way of example, rather than simply choose the match having the best confidence score, which may appear high thereby indicating a high level of confidence in the match, by performing the second round of matching, bootstrapping process 214 may find that there are numerous matching known concepts having the same confidence score, thereby signaling the reality that the quality of, or confidence in, the match is misleading and the match shouldn't be accepted.

Based on the results of 712 and 714, bootstrapping process 214 then determines, at 716, whether or not a suitable match to a known concept exists for the given hub candidate. In particular embodiments, if it is determined at 716 that a match exists in concept database 716, bootstrapping process 214 then determines, at 718, whether or not an existing node (e.g., usually a hub node 304 but also potentially a user node 302) exists in social graph database 206 (In an alternate embodiment, bootstrapping process 214 may attempt to match a hub candidate to an existing node in social graph database 206 first before resorting to attempting to match the hub candidate to known concepts not having corresponding existing nodes in social graph database 206). If it is determined at 718 that the matching known concept has a corresponding hub node 304 (or user node 302) in social graph database 206, then bootstrapping process 214 may then call edge-generating API 210 at 720, which then generates, at 722, an edge between the user node 302 from or for which the hub candidate was identified to the hub node 304 or (user node 302) corresponding to the matched known concept. In contrast, if it is determined at 718 that a corresponding hub node 304 (or user node 302) in social graph database 206 does not already exist for the matching known concept, then bootstrapping process 214 may then call node-generating API 212 at 724, which then generates, at 726, a hub node 304 (or user node 302) for the matching known concept. Bootstrapping process 214 may then call edge-generating API 210 at 728, which then generates, at 730, an edge between the user node 302 from or for which the hub candidate was identified to the newly created hub node 304 or (user node 302) corresponding to the matched known concept.

In particular embodiments, if it is determined that a match cannot be found for the character string associated with the hub candidate, at least according to a desired or predetermined level of confidence, bootstrapping process 214 may then determine, at 732, whether the hub candidate is splittable; that is, whether the character string can be split into separate hub candidates. By way of example, a match from a hub candidate to a known concept may not be found at 716 for a variety of reasons, the simplest of which may be that the hub candidate is too generic to identify a known concept with confidence, is drastically misspelled or entered wrong, or, of particular interest, is considered a "higher order" concept that, generally, involves a phrase and even two or more concepts. By way of example, a user may have typed a declaration that, even after pre-processing at 706, results in the higher order hub candidate character string "all movies with Johnny Depp or Edward Norton." To facilitate this process, bootstrapping process 214 may keep a list of "connector words" such as "and" or "or," among others. In particular embodiments, if a confident match for a character string such as this can't be found, bootstrapping process 214 may make the determination at 732 as to whether the character string corresponding to the hub candidate is splittable. In particular embodiments, if it is determined that the character string is splittable at 732 (e.g., bootstrapping process 214 identified connector words in the character string), then bootstrapping process 214 splits the character string into one or more hub candidates at 742. For each of these split hub candidates (e.g., "all movies with Johnny Depp" and "all movies with Edward Norton"), bootstrapping process 214 then proceeds as before beginning with step 708.

As another example, bootstrapping process 214 may use a second list of "common phrase language" that it may use to determine if a hub candidate is splittable or, more particularly, reducible at 732. By way of example, in the above example, the part of the character string that reads "all movies with" may be identified as common phrase language and removed, thereby resulting in the separate hub candidates of simply "Johnny Depp" and "Edward Norton."

However, in particular embodiments, in cases in which the character string is not splittable such as, for example, when bootstrapping process 214 is unable to identify any connector words (e.g., and, or, etc.), bootstrapping process 214 reverts to a fallback mechanism in which it automatically creates a "fallback node (e.g., a fallback hub node 304);" that is, bootstrapping process 214 assumes that the user correctly entered a concept meaningful to him or her. More particularly, bootstrapping process 214 calls node-generating API 212 at 734, which then generates a new hub node 304 in social graph database 206 corresponding to the hub candidate character string. In particular embodiments, bootstrapping process may or may not then call edge-generating API 210 at 738 to generate, at 740, an edge from the user's node 302 to the new fallback hub node 304.

In particular embodiments, the determination of whether or not to create a fallback hub node 304 is based on several criteria, many of which are implementation specific. As an example, consider that a user may have entered "The Matrix trilogy." In particular embodiments, bootstrapping process 214 may have the intelligence to determine, based on information in concept database 216, that this character string actually refers to three Matrix movies. In particular embodiments, bootstrapping process 214 may cause a new hub node 304 for the matrix trilogy to be generated, but more likely, may generate edges to each of the three hub nodes 304 corresponding to the original Matrix movie and the two sequels, respectively. In particular embodiments, bootstrapping process 214 may also then cause edges to be created between the individual hub nodes 304 associated with the Matrix movies.

Figure 8:
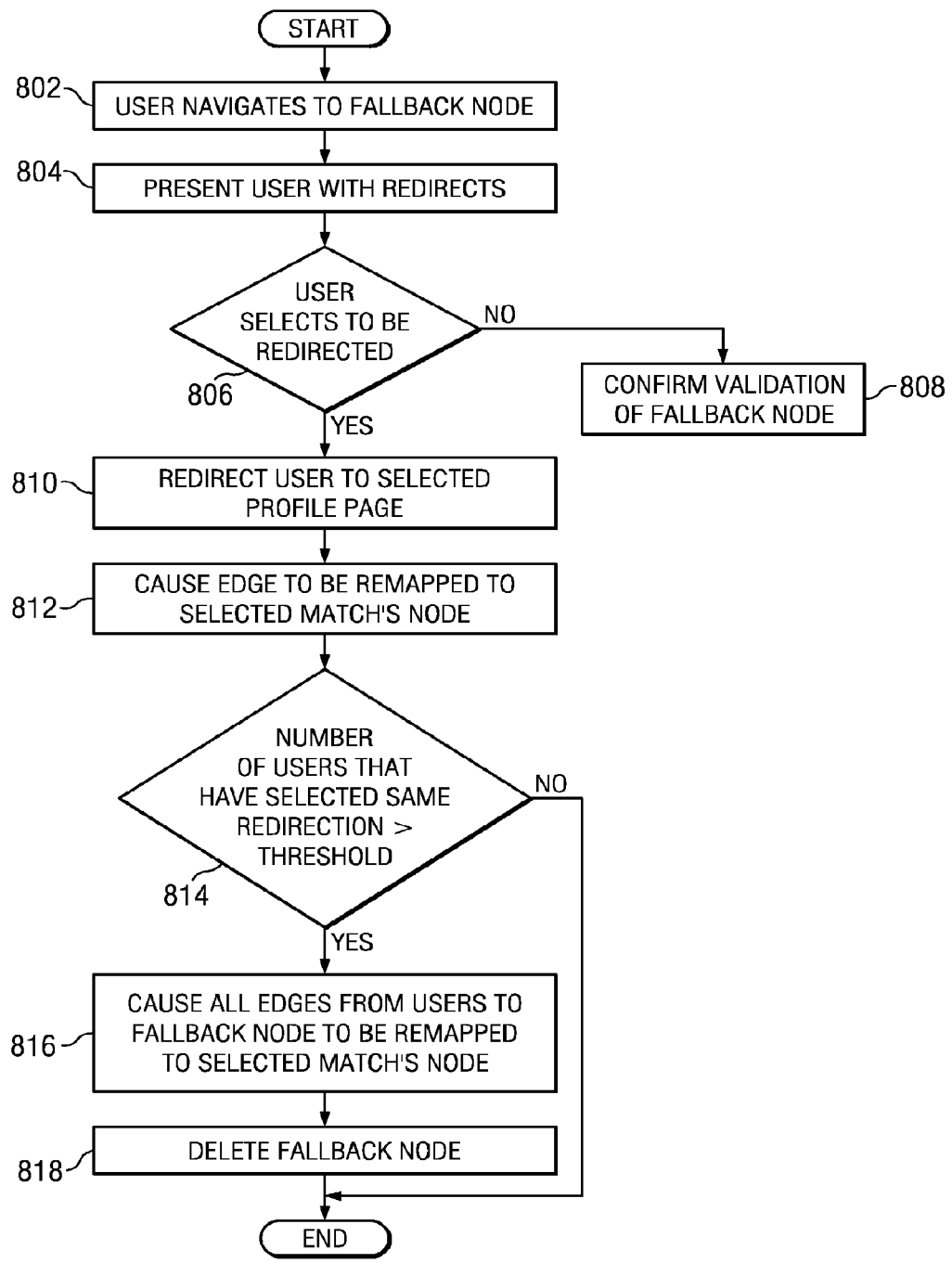
FIG. 8 shows a flowchart illustrating an example method for validating a concept node.

FIG. 8 shows a flowchart illustrating an example method for validating a hub node 304. In particular embodiments, when a fallback hub node 304 is generated because a confident match could not be found, the best matches that were found may be stored with the fallback node or with an edge that connects the fallback node to the user's node 302. In this way, if and when the user navigates to the hub associated with the fallback hub node 304 at 802, the user may be presented, at 804, with a list of suggestions corresponding to the list of best matches that were below the threshold needed to be considered a match at 716. By way of example, the hub corresponding to the fallback hub node 304 may be flagged in social graph database 206. More particularly, the user may be prompted with a list of names (e.g., hyperlinks) or thumbnail images of the hubs or profile pages of associated nodes corresponding to the best matches or, alternately, with an "ad" or "social ad" asking the user if he or she would like to be redirected to one of the suggested hubs or profile pages of associated nodes corresponding to the best matches. In particular embodiments, if the user does not click on a redirect link or otherwise select to be redirected to one of the suggested matches, then bootstrapping process 214 confirms that the fallback hub node 304 is indeed a valid node at 808. In particular embodiments, if the user clicks on a redirect link or otherwise selects to be redirected to one of the suggested matches, then bootstrapping process 214 redirects the user to the hub corresponding to the node associated with the selected redirection at 810, causes the edge from the user's node to the fallback hub node 304 to be remapped at 812 to the selected match's node (which may involve deleting the old edge to the fallback node and generating a new edge to the selected node). In some embodiments, if it is determined, at 814, that the number of users connected to the same fallback hub node 304 but who, after navigating to the hub corresponding to the fallback node, selected the same redirection is greater than a threshold, then bootstrapping process 214 causes the edges connected with that fallback hub node 304 to be remapped at 816 to the node corresponding to the selected redirection. In one embodiment, in such a case, the fallback hub node 304 is then deleted at 818.

In other alternate embodiments, rather then generating fallback hub nodes 304, bootstrapping process 214 may cause an interface to be presented to the user upon the user's next login that displays the hub candidates that bootstrapping process 214 was unable to match to known concepts. The interface may prompt the user to select to keep the user's entered text (corresponding to the unmatched hub candidate) unchanged, which may then result in the creation of a new hub node 304 for the hub candidate and the creation of a new edge from the user's node to the new hub node 304. Otherwise, the user may be prompted to select from a shortlist of best matches, which may then result in the creation of an edge from the user's node to the node corresponding to the selected match.

In particular embodiments, similar processes can be used to create new hub nodes 304 from existing hub nodes 304 as well as new edges from existing hub nodes 304 to other existing or new hub nodes 304. Additionally, in particular embodiments, there may be a review process, which may be machine or human implemented, that reviews newly generated nodes and determines whether to delete them or to add their content (e.g., merge them) with other existing nodes. By way of example, a newly generated hub node 304 for the concept "I love Britney Spears" may be deleted and any content in it may be added to an existing hub node 304 for "Britney Spears." Additionally, if it is determined that a hub node 304 and its corresponding hub aren't being accessed by enough users or enough in a given time interval, the node may be deleted. Furthermore, as social network environment 20 may support users who use a variety of languages, in particular embodiments, the typeahead processes 204 and 208 or bootstrapping process 214 may decide to create a new node related to a particular concept identified from a user of one language even though the node already exists in another language. Alternately, the typeahead processes 204 and 208 or bootstrapping process 214 may decide to connect a user that typically uses one language to an existing node corresponding to the particular concept identified from the user even though the information stored with the existing node is in a different language.

FIG. 9, referenced above, shows a flowchart illustrating an example method, implemented by or in conjunction with one or more server-side recommendation-generating processes 218 (hereinafter referred to as recommendation-generating process 218) illustrated in FIG. 2B, for generating one or more recommendations, and particularly recommended hubs corresponding to respective hubs nodes 304 in social graph database 206, for display to a user requesting or currently viewing a particular hub, based at least in part on information extracted from social graph database 206. In particular embodiments, the recommendation-generating process 218 leverages the social graph data from social graph database 206, which may include one or more searchable or queryable indexes generated by indexing social graph database 206, to generate recommendations, and particularly recommended hubs, based on at least two contributions from the social graph data.

In particular embodiments, recommendation-generating process 218 determines recommended hubs for a particular user (the "requesting user") requesting or currently viewing a particular hub (the "requested hub"), and further causes the recommended hubs to be displayed or listed in recommendations section 510 of the hub described above with reference to FIG. 5. In particular embodiments, recommendation-generating process 218 determines recommended hubs based on leveraging information extracted from social graph database 206 including information about one or more of: the requesting user, the requested hub, friends of the user whose user nodes 302 may or may not also be connected to the requested hub's hub node 304 with respective edges, and other hubs having respective hub nodes 304 that are also connected to the requested hub's hub node 304. As described above, for example, the recommended hubs displayed in recommendations section 510 may include hubs that are liked or otherwise connected (with edges in social graph database 206) to friends of the requesting user (as defined by edges in social graph database 206), and particularly friends that are also connected to the requested hub (with edges in social graph database 206). As another example, the recommended hubs displayed in recommendations section 510 may include hubs that users, and particularly friends of the requesting user (as defined by edges in social graph database 206), also like or are otherwise connected to (with edges in social graph database 206), but who aren't necessarily connected with the requested hub (with edges in social graph database 206). As another example, the recommended hubs displayed in recommendations section 510 may include hubs that are connected to the requested hub (with edges in social graph database 206) and one or more friends of the requesting user (as defined by edges in social graph database 206). As another example, the recommended hubs displayed in recommendations section 510 may include hubs that are connected to the requested hub (with edges in social graph database 206) but that aren't necessarily connected with friends of the requesting user (as defined by edges in social graph database 206). Generally, as described above, one goal or motivation for displaying recommended hubs to the requesting user currently viewing or requesting a particular hub is to provide the user with recommended hubs the user may be interested in viewing or interacting with and, furthermore, facilitate navigation to such recommended hubs from the currently viewed hub and, in particular embodiments, facilitate the creation of edges connecting the user to one or more of the recommended hubs the user demonstrates or indicates an interest in.

In particular embodiments, the method begins when social network environment 20 receives a request for a particular hub (the requested hub) from a particular user (the requesting user) at 902. In particular embodiments, in response to the request, social network environment 20, and particularly page-generating process 200, generates a structured document for rendering the hub at the requesting user's client device 30 and transmits an initial response that includes the structured document to the requesting user's client device 30 at 904. The structured document transmitted to the requesting user may be a base structured document that includes markup language code as well as various code segments, scripts, resources, or other information or content for serving the requested hub to the client for rendering by the client's web browser 202. In some embodiments, the base structured document may include code for rendering one or more portions of the requested hub including code for displaying portions of the recommendations section 510 but may not include the recommended hubs themselves in the form of hub names or other identifiers 512 and images 514; that is, in one implementation, social network environment 20 may transmit the structured document at 904 in the initial response before the recommended hubs are determined by recommendation-generating process 218. In this way, the client's web browser 202 may start rendering the structured document and downloading resources for rendering the requested hub as recommendation-generating process 218 completes it's determination of recommended hubs.

In such embodiments, in parallel with or after the generation of the base structured document or sending of the initial response, recommendation-generating process 218 generates recommended hubs that are then transmitted in one or more subsequent responses to the requesting user's client device 30 at 922 for rendering by the client's web browser 202. In one particular embodiment, after the request for the hub is received by social network environment 20 at 902, page-generating process 200 or other process executing within social network environment 20 transmits an instruction or query at 906 to recommendation-generating process 218 requesting one or more recommended hubs for display in recommendations section 510. In an example embodiment, the instruction or query includes information such as an identifier of the user (e.g., a user ID that identifies the requesting user's user node 302) and an identifier of the requested hub (e.g., a hub ID that identifies the requested hub's hub node 304).

In particular embodiments, in response to the instruction or query at 906, recommendation-generating process 218 then determines or identifies a first data set, at 908, that includes hubs that are each connected (via edges in social graph database 206) with one or more users who are, in turn, each connected with both the requesting user (e.g., friends of the requesting user) and also connected with the requested hub (e.g., users that also like the requested hub). In particular embodiments, in parallel with or after determining the first data set at 908, recommendation-generating process 218 determines a second data set, at 910, that includes hubs that are each connected both with the requested hub (via edges in social graph database 206) and also connected with one or more users who, in turn, are connected (via edges in social graph database 206) to the requesting user (e.g., friends of the requesting user). Generally, the first and second data sets may include one or more of the same hubs.

In one particular embodiment, as described above, social graph database 206 may include one or more queryable (searchable) indexes generated by indexing the data within social graph database 206 (alternately, in another embodiment, the indexes may be stored in one or more data stores or databases outside of social graph database 206). In one particular implementation, an indexing process 220 generates or updates the indexes periodically (e.g., daily). Additionally, or alternately, the indexes may be updated dynamically in response to the creation of new nodes or new edges in social graph database 206 as well as in response to other actions (e.g., in response to interactions between users and hubs or in response to edits made to user profile pages or hubs). In one particular implementation, indexing process 220 may generate a plurality of indexes to facilitate the determinations at 908 and 910. By way of example, indexing process 220 may generate and maintain an index of all registered users that is indexed by user ID (e.g., the identifiers of the users and respective user nodes 302 in social graph database 206) and which includes, for each user ID, the set of other users identified by their respective user IDs whose respective user nodes 302 are connected to the user node 302 corresponding to the particular user ID in the index. As another example, indexing process 220 may generate and maintain another index of all registered users that is again indexed by user ID but which includes, for each user ID, the set of hubs or respective hub nodes 304 identified by their respective hub IDs (e.g. the identifiers of the hubs and respective hub nodes 304 in social graph database 206) that are connected to the user node 302 corresponding to the particular user ID in the index. As another example, indexing process 220 may generate and maintain another index of all the hubs indexed by hub ID and that includes, for each hub ID, the set of other hubs and respective hub nodes 304 identified by hub ID that are connected to the hub node 304 corresponding to the particular hub ID in the index. As another example, indexing process 220 may generate and maintain another index of all the hubs indexed by hub ID and that includes, for each hub ID, the set of users and respective user nodes 302 identified by user ID that are connected to the hub node 304 corresponding to the particular hub ID in the index.

In such embodiments, recommendation-generating process 218 may determine the first and second data sets at 908 and 910, respectively, by querying the indexes generated by indexing process 220. This may involve querying indexing process 220 itself or some other process that is configured to receive queries and return results based on searching one or more of the indexes. By way of example, in a particular implementation, recommendation-generating process 218 determines the first data set at 908 by sending a first nested query to indexing process 220 that, in a first part or step of the first nested query, instructs indexing process to identify all the user IDs corresponding to users who are connected (e.g., friends) with the requesting user. In a second part of the nested query, indexing process 220 is instructed to identify which of the user IDs identified in the first part correspond to users who are also connected with the requested hub. In a third part of the first nested query, indexing process 220 is instructed to return, to recommendation-generating process 218, the hub IDs corresponding to the hubs connected with the user IDs identified in the second part of the query (but in particular embodiments, excluding those hub IDs corresponding to hubs already connected to the requesting user) as well as the user IDs themselves matched with each of the hub IDs. In a similar fashion, recommendation-generating process 218 may determine the second data set at 910 by sending a second nested query to indexing process 220 that instructs indexing process to determine all the hub IDs corresponding to hubs that are connected with the requested hub and then return, to recommendation-generating process 218, the hub IDs corresponding to the ones of the identified hubs that are also connected with one or more users connected with the requesting user (but in particular embodiments, excluding those hub IDs corresponding to hubs already connected to the requesting user) as well as the user IDs themselves matched with each of the hub IDs.

Additionally, in some embodiments, the hub indexes generated by indexing process 220 are indexed, arranged, or otherwise searchable by hub category (e.g., movie, music, activity, sport, etc.). In some embodiments, the hubs returned in the first and second data sets may only include hubs sharing the same category as the requested hub. In other embodiments, hubs of different categories may be included in the returned data sets.

Thus, in various example embodiments, each of the first and second data sets includes a list or index of hubs (e.g., identified by hub ID) as well as, for each hub, a set of one or more users (e.g., identified by user ID) connected with the respective hub. In one implementation, recommendation-generating process 218 then generates a score for each hub identified in the first and second data sets at 912 and subsequently ranks the hubs based on their respective scores at 914 to generate a single combined or correlated list of ranked hubs that are candidates (hereinafter also referred to as "candidate hubs") for recommended hubs. In particular embodiments, recommendation-generating process 218 scores each hub in each of the first and second data sets based at least in part on the number of users (i.e., the friends of the requesting user) returned with the respective hub in the first or second data sets.

In one embodiment, recommendation-generating process 218 scores the hubs in each of the first and second data sets and then combines the resulting scores. By way of example, if a hub in the first set is connected with five of the requesting user's friends, that hub may be assigned a score or weight of five by recommendation-generating process 218. Similarly, if a hub in the second set is connected with four of the requesting user's friends, that hub may be assigned a score or weight of four by recommendation-generating process 218. In such an implementation, recommendation-generating process may then generate a combined data set that includes all of the hubs in each of the first and second data sets and combine or correlate the scoring results based on each of the first and second data sets to generate a single correlated score for each of the hubs at 912 in the combined data set. The single correlated scores for the respective candidate hubs are then used in ranking the hubs in the correlated ranked list of hubs at 914. In one implementation, the weights assigned to the hubs in the first and second data sets are themselves weighted equally by recommendation-generating process 218. By way of example, a hub with a weight of five from the first data set may be assigned a score of five in the single correlated ranked list. Similarly, a hub with a weight of four from the second data set may be assigned a score of four in the single correlated ranked list. Additionally, as the first and second data sets may share common hubs, if a hub returned in both of the first and second data sets was assigned a weight of six based on the first data set and assigned a weight of three based on the second data set, recommendation-generating process may sum the individual weights and assign the hub a score of nine in the single correlated ranked list (6+3=9). However, as the friends used to generate the weights may be shared in the first and second data sets, recommendation-generating process 218 may reduce the combined score to account for this. By way of example, continuing the above example, assuming that a hub found in both data sets also shares two friends in each data set, the resultant correlated score for the hub may be calculated as seven (6+3−2=7).

However, in particular embodiments, recommendation-generating process 218 may first combine the first and second data sets to generate one combined data set and then score each of the hubs in the resultant combined data set. In this way, hubs and associated users shared between the data sets may be accounted for, if desired, before generating a score for the hub.

In particular embodiments, recommendation-generating process 218 determines a score for each hub in the combined data set at 912 based on other factors other than simply the number of the requesting user's friends connected with the respective hub. By way of example, in one embodiment, recommendation-generating process 218 may query indexing process 220 for one or more other data sets. As an example, in an additional or alternate embodiment, recommendation-generating process 218 may determine a third data set that includes all the hubs connected with the requested hub, or all the hubs that are connected with the requested hub and not connected to any of the requesting user's friends. As another example, recommendation-generating process 218 may determine a fourth data set that includes all of the hubs connected with the requesting user's friends, or all of the hubs connected with the requesting user's friends but not connected to the requested hub. These third or fourth data sets may be used in augmenting the data in the first and second data sets or to provide additional criteria (e.g., a global filter that indicates an overall popularity of each of the hubs) with which to score the hubs in the first and second data sets. Furthermore, the third and fourth data sets may be particularly useful in cases in which there are not any friends of the user that are connected with the requested hub or in which none of the hubs connected with the requested hub are connected to any of the requesting user's friends.

In one example implementation, recommendation-generating process 218 may weight the hubs in such third or fourth data sets differently than the hubs in the first and second data sets. By way of example, in one implementation, each hub in the third or fourth data sets are weighted according to the total number of user nodes 302 connected with the respective hub's hub node 304. However, when combining the first, second, third, and fourth data sets and calculating a correlated score for each hub in the combined data set at 912, the number of total users connected with each hub in the third and fourth data sets may account for a smaller contribution to the single correlated score. By way of example, if "hub A" is found in each of the first, second, third, and fourth data sets and is associated with 5 users in the first data set, 4 non-shared users in the second data set, 50 users in the third data set, and 75 users in the fourth data set, recommendation-generating process may calculate the correlated score for the hub as 5a+4b+50c+75d where a, b, c, and d are the weights with which the respective number of users are multiplied by. As an example, in one implementation, a=1, b=1, c=0.01, and d=0.01 such that the correlated score for the hub A is 5+4+0.5+0.75=10.25.

Additionally or alternately, in some embodiments, recommendation-generating process 218 may determine, at 912, the single correlated score for each hub in the first and second data sets (in some embodiments the hubs in the third and fourth data sets that are not also in one or more of the first and second data sets are not scored) by summing or otherwise combining, for each hub in the combined data set, a number of coefficient scores that are, in turn, generated for each hub in the combined data set and each user connected with the respective hub. In particular embodiments, a coefficient score in this sense refers to the strength of the connection (as defined or represented by an edge) or plurality of connections. The coefficient scores generated by recommendation-generating process 218 for a particular hub and associated users may be based on numerous and various criteria. By way of example, determining a single correlated score for each hub in the combined data set at 912 may involve recommendation-generating process 218 generating one or more coefficient scores between each hub in the combined data set and each of the requesting user's friends connected to the respective hub, one or more coefficient scores between each hub in the combined data set and the requesting user, one or more coefficient scores between each hub in the combined data set and the requested hub, or one or more coefficient scores between the requesting user and each of the users connected with a hub from the combined data set. Determining a single correlated score for each hub in the combined data set at 912 may additionally involve summing or otherwise combining each of the coefficient scores to generate the single correlated score for each hub.

The coefficient scores generated for each hub or user connected with the hub may be based on factors such as, by way of example and not by way of limitation, the relationship of the user to the hub; the relationship of the user to the requesting user (e.g., friend, relative, spouse, etc.); a level or frequency of interaction between the hub and the user (e.g., how many times the user views the hub or how much content was added to the hub by the user over a period of time); a level or frequency of interaction between the user and the requesting user (e.g., how times the users viewed one another's profile pages or how many times the users posted comments, wall (feed) postings, sent messages, or otherwise interacted with one another's profile pages over a period of time); the number of user nodes 302, hub nodes 304, or total nodes connected to both the hub and the user, or connected to both the user and the requesting user, or connected to both the hub and the requested hub, or connected to both the hub and the requested user; the quantity or quality of shared content between the hub and the requested hub, etc.

In a particular implementation, in order to calculate coefficient scores and subsequently single correlated scores for each of the hubs in the combined data set, the data results returned in the first and second data sets (and in some embodiments the third and fourth data sets as well) are first sent by recommendation-generating process (or directly from indexing process 220) to a data mining system such as, for example, HIVE (a data warehouse infrastructure built on top of HADOOP) where HADOOP then runs or executes a number of MapReduce jobs or processes on the data to generate the coefficient scores which are then used by recommendation-generating process 218 to generate the single correlated scores for each hub at 912.

In particular embodiments, recommendation-generating process 218 ranks the hubs by their respective correlated scores and generates a ranked list of hubs (e.g., a ranked list of hub IDs) at 914 with the hubs having the highest correlated scores representing the most relevant hubs. In particular embodiments, recommendation-generating process 218 then selects, at 916, the top x (e.g., four in the illustrated embodiment) hubs having the highest correlated scores as the recommended hubs to be displayed in recommendations section 510.

In particular embodiments, recommendation-generating process 218 then communicates, at 918, the hub IDs of the recommended hubs to page-generating process 200 or other process that then generates, at 920, code including, for example, HTML or other markup language code as well as, in some embodiments, various other code segments or resources including, for example, image resources for use in rendering the recommended hub names 512 or images 514 in recommendations section 510, and in some embodiments, code segments for implementing hyperlinks that direct the user to a recommended hub upon clicking or otherwise selecting a recommended hub name text field 512 or hub image 514. The code and resources are then sent to the user's client device 30 in a subsequent response at 922 for rendering by the client's web browser 202. In particular embodiments, the subsequent response sent at 922 is sent using AJAX or other asynchronous techniques as the base structured document for rendering the requested hub may have already been sent in an initial response at 904. In an alternate embodiment, social network environment 20 waits for recommendation-generating process 218 to provide the hub IDs of the recommended hubs and includes the code or resources for displaying the recommended hub names 512 or hub images 514 with the rest of the structured document for rendering the hub at the client device 30 prior to sending the structured document to the requesting user.

In some embodiments, code for rendering user names (e.g., text) 516 or user images 518 (e.g., user profile pictures or avatars) of a select subset of the users connected with each of the recommended hubs and the requesting user is also sent with the subsequent response at 922 for rendering and display next to the respective recommended hub in recommendations section 510. Additionally or alternately, the subsequent response sent at 922 may include code for displaying a text string for each of the recommended hubs in proximity to the respective recommended hub that reads, for example, "n of your friends also like this," where n is the number of the requesting user's friends that are connected to the respective recommended hub or "these friends also like this," where "these friends" are represented by the user names 516 or user images 518 displayed next to the respective recommended hub, or "n of your friends also like this including:".

Furthermore, in particular embodiments, upon clicking or otherwise selecting a hyperlink (e.g., clicking text 512 or images 514) corresponding to a particular one of the recommended hubs, the user may be prompted with a user interface that asks the user if he or she would like to be connected with the recommended hub. By way of example, upon clicking an image 514 corresponding to a recommended hub, the user's web browser 202 may send a request for the hub to social network environment 20. In response to the request, social network environment 20, and particularly, page-generating process 200 constructs a structured document to be sent to the web browser 202 for rendering. Prior to, in parallel with, or after the construction or sending of the structured document corresponding to the selected recommended hub, social network environment 20, may send a response to the web browser 202 that causes the web browser to display the user interface asking the user if he or she would like to be connected with the recommended hub (e.g., the user interface may present a link that reads "I like hub A," where hub A is the name of the selected recommended hub. Alternately, the initial response or subsequent response that included the recommended hubs may include one or more code segments (e.g., JavaScript) that when executed by the web browser 202 implement a client-side process that recognizes when recommended hubs are selected and which may cause the user interface to be displayed and which may further use asynchronous techniques (e.g., AJAX) or other suitable techniques to communicate a message to social network environment 20 that a recommended hub was selected. In response to the user indicating a desire to be connected with the selected recommended hub (e.g., by clicking the link in the user interface prompt), the client-side process may use asynchronous techniques (e.g., AJAX) or other suitable techniques to communicate a message to social network environment 20 that the user desired to be connected with the selected recommended hub. In response, edge-generating API 210 to cause an edge to be created in social graph database 206 that connects the user to the selected recommended hub.

In particular embodiments, as described above, wall (or news feed/activities feed) section 501*a*, or other feed or activities section of the hub, displays comments, status updates, wall posts and other user activities associated with the user and friends of the user that are viewing the hub. The wall (or news feed/activities feed) section 501*a*, or other feed or activities section of the hub may also display comments, status updates, wall posts and other user activities and user generated content that are related to the concept for which the hub was created as well as, in some embodiments, the concepts associated with the recommended hubs determined for the currently requested or viewed hub. More particularly, recommendation-generating process 218 may perform a search on comments, status updates, wall posts and other user-generated content and user activities associated with the requesting user and friends of the requesting user filtered by concept; that is, a keyword search for keywords related to the concept of the currently requested or viewed hub (and potentially keywords related to the concepts associated with the recommended hubs) in these streams of user feeds or activities related to the requesting user and the requesting user's friends, and display this subset of user content or activities in the wall or feed section of the currently requested or viewed hub.

Moreover, those of skill in art will readily be able to apply the teachings described with reference to the flowchart of FIG. 9 to determine and cause to be displayed recommended hubs (or recommended users) to a user requesting or currently viewing another user's profile page within a recommendations section displayed on the other user's profile page.

The applications or processes described herein can be implemented as a series of computer-readable instructions, embodied or encoded on or within a tangible data storage medium, that when executed are operable to cause one or more processors to implement the operations described above. While the foregoing processes and mechanisms can be implemented by a wide variety of physical systems and in a wide variety of network and computing environments, the computing systems described below provide example computing system architectures of the server and client systems described above, for didactic, rather than limiting, purposes.

Figure 10:
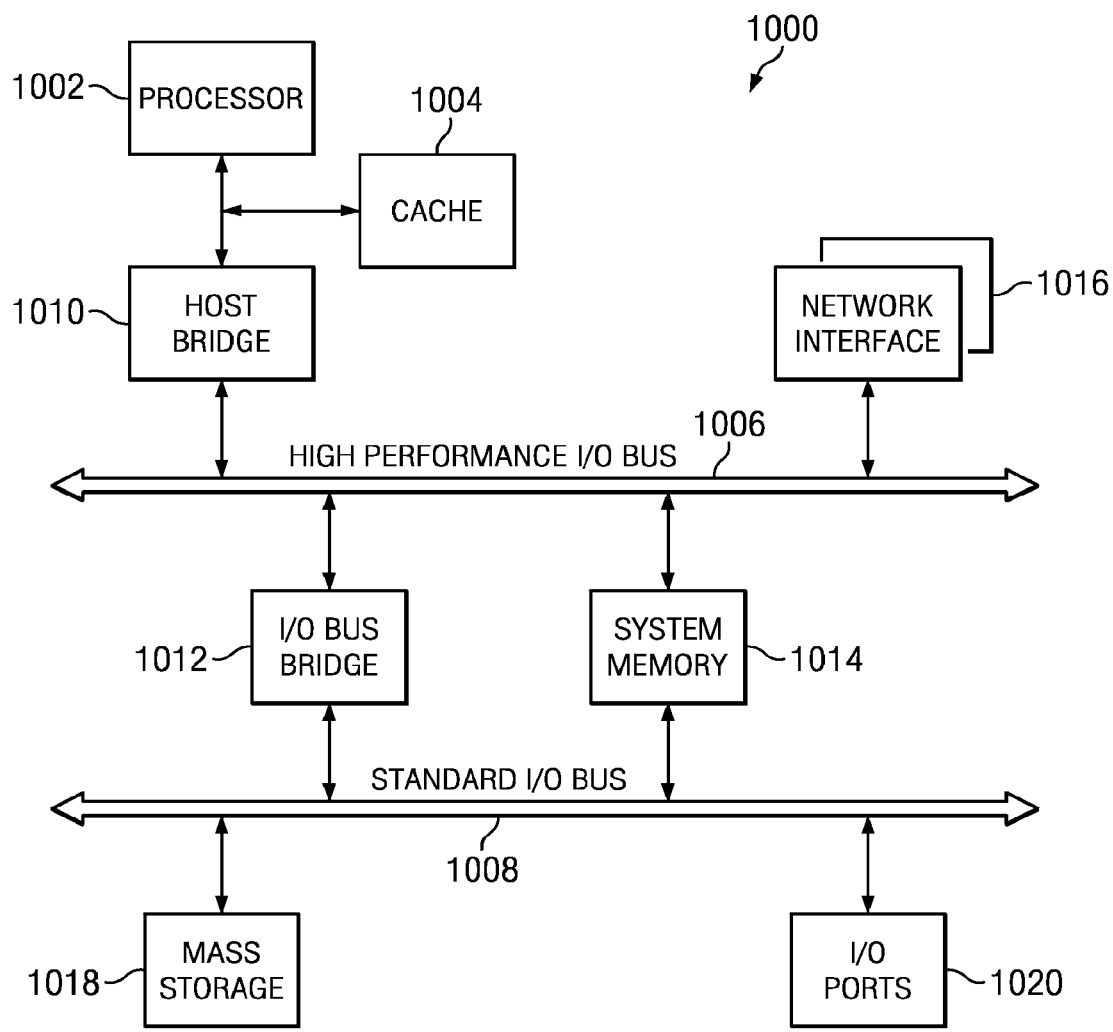
FIG. 10 illustrates an example computer system architecture.

FIG. 10 illustrates an example computing system architecture, which may be used to implement a server 22a, 22b. In one embodiment, hardware system 1000 comprises a processor 1002, a cache memory 1004, and one or more executable modules and drivers, stored on a tangible computer readable medium, directed to the functions described herein. Additionally, hardware system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network/communication interfaces 1016 couple to bus 1006. Hardware system 1000 may further include video memory (not shown) and a display device coupled to the video memory. Mass storage 1018, and I/O ports 1020 couple to bus 1008. Hardware system 1000 may optionally include a keyboard and pointing device, and a display device (not shown) coupled to bus 1008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1000 are described in greater detail below. In particular, network interface 1016 provides communication between hardware system 1000 and any of a wide range of networks, such as an Ethernet (e.g., IEEE 802.3) network, a backplane, etc. Mass storage 1018 provides permanent storage for the data and programming instructions to perform the above-described functions implemented in the servers 22a, 22b, whereas system memory 1014 (e.g., DRAM) provides temporary storage for the data and programming instructions when executed by processor 1002. I/O ports 620 are one or more serial and/or parallel communication ports that provide communication between additional peripheral devices, which may be coupled to hardware system 1000.

Hardware system 1000 may include a variety of system architectures; and various components of hardware system 1000 may be rearranged. For example, cache 1004 may be on-chip with processor 1002. Alternatively, cache 1004 and processor 1002 may be packed together as a "processor module," with processor 1002 being referred to as the "processor core." Furthermore, certain embodiments of the present invention may not require nor include all of the above components. For example, the peripheral devices shown coupled to standard I/O bus 1008 may couple to high performance I/O bus 1006. In addition, in some embodiments, only a single bus may exist, with the components of hardware system 1000 being coupled to the single bus. Furthermore, hardware system 1000 may include additional components, such as additional processors, storage devices, or memories.

In one implementation, the operations of the embodiments described herein are implemented as a series of executable modules run by hardware system 1000, individually or collectively in a distributed computing environment. In a particular embodiment, a set of software modules and/or drivers implements a network communications protocol stack, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 1002. Initially, the series of instructions may be stored on a storage device, such as mass storage 1018. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 1016. The instructions are copied from the storage device, such as mass storage 1018, into memory 1014 and then accessed and executed by processor 1002.

An operating system manages and controls the operation of hardware system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. By way of example, while embodiments of the present invention have been described as operating in connection with a social networking website, the present invention can be used in connection with any communications facility that supports web applications. Furthermore, in some embodiments the term "web service" and "web-site" may be used interchangeably and additionally may refer to a custom or generalized API on a device, such as a mobile device (e.g., cellular phone, smart phone, personal GPS, personal digital assistance, personal gaming device, etc.), that makes API calls directly to a server.

What is claimed is:

1. A method comprising:
    maintaining, by one or more computing systems, access to a data store of information corresponding to one or more of a plurality of users of a social network environment and one or more of a plurality of concepts and comprising:
        a plurality of nodes including a set of user nodes that each correspond to a respective user, and a set of concept nodes that each correspond to a respective concept, each node of the sets of nodes being associated with a corresponding structured document; and
        a plurality of edges that each define a connection between a corresponding pair of nodes from the plurality of nodes;
    receiving, by one or more of the computing systems, from a client device, a user-generated character string comprising one or more characters of text entered by a user in an input form rendered at the client device as they are entered by the user;
    searching, by one or more of the computing systems, the stored information for one or more matches between the user-generated character string and existing nodes from the set of concept nodes;
    determining, by one or more of the computing systems, whether a match between the user-generated character string and an existing node from the set of concept nodes exists; and
    generating, by one or more of the computing systems, in response to determining that at least one match exists, an edge between the node corresponding to the user and the node for which the best match is determined.

2. The method of claim 1, wherein the user-generated character string is received from a client-side process executing within the client device or from a client-side document rendering application in response to one or more instructions from the client-side process.

3. The method of claim 2, wherein the client-side process is transmitted from one or more of the computing systems to the client device in a first structured document transmitted to the client device in response to a request received by one or more of the computing systems for the first structured document.

4. The method of claim 1, further comprising receiving, by one or more of the computing systems, a section identifier that identifies a category of a section of a user profile page corresponding to the input form in which the user-generated character string was entered.

5. The method of claim 4, wherein searching the stored information for one or more matches between the user-generated character string and existing nodes from the set of concept nodes comprises searching the stored information for matches between the user-generated character string and existing nodes from the set of concept nodes that have corresponding category identifiers that match the category of the section identifier.

6. The method of claim 1, wherein searching the stored information for one or more matches between the user-generated character string and existing nodes from the set of concept nodes comprises using one or more string matching algorithms to attempt to match the user-generated character string with a string of characters associated with each of one or more of the existing nodes.

7. The method of claim 6, wherein determining whether or not a match between the user-generated character string and an existing node from the set of concept nodes exists comprises computing a confidence score for each attempted match based on one or more of: a determination of how well the text in the user-generated character string matches the text in the string of characters associated with the existing node.

8. The method of claim 7, wherein the confidence score is further computed based on one or more other factors including one or more of: the number of the other users having respective user nodes connected to the user's node and to the existing concept node, the number of total users having respective user nodes connected to the existing concept node, the number of other existing concept nodes connected to the existing node.

9. The method of claim 1, further comprising, when the one or more computing systems determine that at least one match exists, transmitting, by the one or more computing systems, a response to the client device that includes the name or other identifier of the node which the best match is determined; and
    auto-populating, by the client-side process, the input form with the name or other identifier of the node for which the best match is determined.

10. The method of claim 9, generating an edge between the node corresponding to the user and the node for which the best match is determined comprises generating an edge between the node corresponding to the user and the node for which the best match is determined in response to the user clicking or otherwise selecting the auto-populated name or other identifier of the node.

11. The method of claim 1, further comprising, in response to determining that no match between the user-generated character string and an existing node from the set of concept nodes exists:
    generating, by one or more of the computing systems, a new node in the set of concept nodes based on the user-generated character string; and
    generating, by one or more of the computing systems, an edge between the node corresponding to the user and the new node.

12. A system comprising: one or more processors; and logic encoded in one or more computer-readable tangible storage media that, when executed by the one or more processors, is operable to:
    maintain access to a data store of information corresponding to one or more of a plurality of users of a social network environment and one or more of a plurality of concepts and comprising:
        a plurality of nodes including a set of user nodes that each correspond to a respective user, and a set of concept nodes that each correspond to a respective concept, each node of the sets of nodes being associated with a corresponding structured document; and
        a plurality of edges that each define a connection between a corresponding pair of nodes from the plurality of nodes;

receive from a client device a user-generated character string comprising one or more characters of text entered by a user in an input form rendered at the client device as they are entered by the user;

search the stored information for one or more matches between the user-generated character string and existing nodes from the set of concept nodes;

determine whether or not a match between the user-generated character string and an existing node from the set of concept nodes exists; and generate in response to determining that at least one match exists, an edge between the node corresponding to the user and the node for which the best match is determined.

13. The system of claim 12, wherein the user-generated character string is received from a client-side process executing within the client device or from a client-side document rendering application in response to one or more instructions from the client-side process.

14. The system of claim 13, wherein the client-side process is transmitted to the client device in a first structured document transmitted to the client device in response to a request for the first structured document.

15. The system of claim 12, wherein the logic operable when executed to receive the user-generated character string is further operable when executed to receive a section identifier that identifies a category of a section of a user profile page corresponding to the input form in which the user-generated character string was entered.

16. The system of claim 15, wherein the logic operable when executed to search the stored information for one or more matches between the user-generated character string and existing nodes from the set of concept nodes comprises logic operable when executed to search the stored information for matches between the user-generated character string and existing nodes from the set of concept nodes that have corresponding category identifiers that match the category of the section identifier.

17. The system of claim 12, wherein the logic operable when executed to search the stored information for one or more matches between the user-generated character string and existing nodes from the set of concept nodes comprises logic operable when executed to use one or more string matching algorithms to attempt to match the user-generated character string with a string of characters associated with each of one or more of the existing nodes.

18. The system of claim 17, wherein the logic operable when executed to determine whether or not a match between the user-generated character string and an existing node from the set of concept nodes exists comprises logic operable when executed to compute a confidence score for each attempted match based on one or more of: a determination of how well the text in the user-generated character string matches the text in the string of characters associated with the existing node.

19. The system of claim 12, wherein the logic is further operable when executed to, in response to determining that no match between the user-generated character string and an existing node from the set of concept nodes exists:

generate a new node in the set of concept nodes based on the user-generated character string; and generate an edge between the node corresponding to the user and the new node.

20. One or more computer-readable non-transitory storage media embodying software that is operable when executed to:

maintain access to a data store of information corresponding to one or more of a plurality of users of a social network environment and one or more of a plurality of concepts and comprising:

a plurality of nodes including a set of user nodes that each correspond to a respective user, and a set of concept nodes that each correspond to a respective concept, each node of the sets of nodes being associated with a corresponding structured document; and a plurality of edges that each define a connection between a corresponding pair of nodes from the plurality of nodes;

receive from a client device a user-generated character string comprising one or more characters of text entered by a user in an input form rendered at the client device as they are entered by the user;

search the stored information for one or more matches between the user-generated character string and existing nodes from the set of concept nodes;

determine whether or not a match between the user-generated character string and an existing node from the set of concept nodes exists; and generate in response to determining that at least one match exists, an edge between the node corresponding to the user and the node for which the best match is determined.

* * * * *